United States Patent
Hayasaka et al.

(10) Patent No.: US 8,758,596 B2
(45) Date of Patent: Jun. 24, 2014

(54) HYDROGENATION ISOMERIZATION CATALYST, METHOD FOR PRODUCING SAME, METHOD FOR DEWAXING HYDROCARBON OIL, AND METHOD FOR PRODUCING LUBRICANT BASE OIL

(75) Inventors: Kazuaki Hayasaka, Tokyo (JP); Motoya Okazaki, Tokyo (JP); Mayumi Yokoi, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 362 days.

(21) Appl. No.: 13/140,144

(22) PCT Filed: Dec. 25, 2009

(86) PCT No.: PCT/JP2009/071563
§ 371 (c)(1), (2), (4) Date: Jul. 19, 2011

(87) PCT Pub. No.: WO2010/074215
PCT Pub. Date: Jul. 1, 2010

(65) Prior Publication Data
US 2011/0270010 A1 Nov. 3, 2011

(30) Foreign Application Priority Data

Dec. 26, 2008 (JP) .................................. 2008-334054
Dec. 26, 2008 (JP) .................................. 2008-334249

(51) Int. Cl.
*C10G 73/02* (2006.01)

(52) U.S. Cl.
USPC ................. 208/27; 208/28; 208/133; 502/74; 502/77

(58) Field of Classification Search
USPC ................. 502/60, 64, 71, 73–74, 77, 85–87; 585/9, 13; 208/18, 133–138
See application file for complete search history.

(56) References Cited

U.S. PATENT DOCUMENTS 3,140,249 A 7/1964 Plank et al.
4,177,203 A 12/1979 Kölbel et al.
(Continued)

FOREIGN PATENT DOCUMENTS

CN 1078486 11/1993
CN 1260823 7/2000
(Continued)

OTHER PUBLICATIONS

Liang bai et al., "Slurry phase Fisher—Tropsch synthesis over manganese—promoted iron ultrafine particle catalyst", Fiel, vol. 81, Jul. 8, 2002, pp. 1577-1581.
(Continued)

*Primary Examiner* — Brian McCaig
(74) *Attorney, Agent, or Firm* — Greenblum & Bernstein, P.L.C.

(57) ABSTRACT

A first hydroisomerization catalyst contains a support being a extruded product prepared by calcination having a thermal treatment that includes thermally treating at 350° C. or more and at least one metal supported on the support and selected from the group consisting of metals belonging to Groups 8 to 10 of the periodic table, molybdenum and tungsten, wherein the support contains (a1) a calcined zeolite prepared by calcination having a thermal treatment that includes thermally treating at 350° C. or more of an ion-exchanged zeolite obtained by ion exchange of an organic template-containing zeolite containing an organic template and having a 10-membered ring one-dimensional porous structure in a solution containing ammonium ions and/or protons, and (b1) a calcined inorganic oxide prepared by calcination having a thermal treatment that includes thermally treating at 350° C. or more of one inorganic oxide selected from the group consisting of alumina, silica, titania, boria, zirconia, magnesia, ceria, zinc oxide, phosphorus oxide, and a composite oxide containing a combination of two or more of these oxides, wherein the thermal treatment to which the calcined zeolite has been subjected includes calcination in which the ion-exchanged zeolite that has not been thermally treated at 350° C. or more is heated within the range of 350° C. to 450° C.

22 Claims, 4 Drawing Sheets

(56) References Cited

U.S. PATENT DOCUMENTS

| | | | |
|---|---|---|---|
| 4,206,134 | A | 6/1980 | Kugler et al. |
| 4,683,214 | A | 7/1987 | Angevine et al. |
| 5,143,879 | A * | 9/1992 | Whitehurst .................. 502/85 |
| 5,282,958 | A | 2/1994 | Santilli et al. |
| 5,422,375 | A | 6/1995 | Rytter et al. ............. 518/700 |
| 6,156,283 | A | 12/2000 | Allen et al. |
| 6,198,015 | B1 | 3/2001 | Marcilly et al. |
| 6,692,723 | B2 | 2/2004 | Rouleau et al. |
| 6,709,570 | B1 | 3/2004 | Van Crijnen-Beers et al. |
| 7,319,178 | B2 | 1/2008 | Levin et al. |
| 7,393,876 | B2 | 7/2008 | White et al. |
| 7,625,478 | B2 | 12/2009 | Lai et al. |
| 2002/0192156 | A1 | 12/2002 | Rouleau et al. |
| 2004/0186006 | A1 | 9/2004 | Biscardi et al. |
| 2005/0092651 | A1 | 5/2005 | Zones et al. |
| 2005/0130833 | A1 | 6/2005 | Benazzi et al. |
| 2006/0275207 | A1 | 12/2006 | Tiitta et al. |
| 2007/0004947 | A1 | 1/2007 | Zhou et al. |
| 2007/0099797 | A1 | 5/2007 | Hu |
| 2007/0131582 | A1 | 6/2007 | Lai et al. |
| 2007/0249874 | A1 | 10/2007 | Luo et al. |
| 2008/0083657 | A1* | 4/2008 | Zones et al. ............. 208/134 |
| 2009/0277817 | A1 | 11/2009 | Seki et al. ................ 208/27 |
| 2010/0181229 | A1* | 7/2010 | Hayasaka .................. 208/28 |
| 2011/0213041 | A1 | 9/2011 | Tsubaki et al. |

FOREIGN PATENT DOCUMENTS

| | | | |
|---|---|---|---|
| CN | 1463793 | | 12/2003 |
| CN | 101330976 | | 12/2008 |
| EA | 10635 | | 10/2008 |
| EP | 2 165 761 | | 3/2010 |
| JP | 53-59604 | A | 5/1978 |
| JP | 56-48491 | B2 | 11/1981 |
| JP | 3-70691 | B2 | 11/1991 |
| JP | 2000-515185 | | 11/2000 |
| JP | 2001-287911 | | 10/2001 |
| JP | 2001-525723 | | 12/2001 |
| JP | 2003-24786 | A | 1/2003 |
| JP | 2004-528176 | A | 9/2004 |
| JP | 2004-283831 | | 10/2004 |
| JP | 2006-514086 | | 4/2006 |
| JP | 2006-523136 | | 10/2006 |
| JP | 2006-297286 | A | 11/2006 |
| JP | 2007-186613 | | 7/2007 |
| JP | 2008-503440 | A | 2/2008 |
| RU | 2011650 | | 4/1994 |
| RU | 2259878 | | 9/2005 |
| RU | 2365573 | | 8/2009 |
| WO | 91/08998 | | 6/1991 |
| WO | 9857743 | | 12/1998 |
| WO | WO 2001/007538 | * | 2/2001 ............. C10G 45/64 |
| WO | 2007/070521 | | 6/2007 |
| WO | 2008/114597 | A1 | 9/2008 |
| WO | WO 2009/001572 | * | 12/2008 ............. B01J 29/064 |

OTHER PUBLICATIONS

Office action in Chinese Application No. 200980144917.6, dated Mar. 5, 2013.

Notice of Allowance in JP Patent Application No. 2008-334249, dated Apr. 9, 2013.

Notice of Allowance issued in Russian Patent Appl. No. 2011131049, mailed Jul. 5, 2013.

Huybrechts et al., "Bifunctional catalytic isomerization of decane over MTT-type aluminosilicate zeolite crystals with siliceous rim", Journal of Catalysis, 2006, pp. 451-459.

U.S. Appl. No. 13/127,304 to Noritatsu Tsubaki et al., which was filed on May 3, 2011.

Luo et al., "Sol-Gel", Chem. Commun., 1997, pp. 57.

Fukumoto et al., "Sol-Gel Preparation of Mesoporous Manganese Oxide Containing Transition Metal Element and Function Evaluation Thereof", Mesoporous, Manganese, Oxide, Oxidation Reaction,, pp. 1-2.

Tao et al., "Effect of Calcium Promoter on a Precipitated Iron-Manganese Catalyst for Fischer_Tropsch Synthesis", Catalysis Communications, vol. 7, (2006), www.elsevier.com/locate/catcom—online at ScienceDirect www.sciencedirect.com, May 22, 2006, pp. 1061-1066.

International Search Report (PCT/ISA/210) for PCT/JP2009/068967, mail date is Jan. 26, 2010.

International Preliminary Report on Patentability (PCT/IB/373) and Written Opinion (PCT/IB/237) for PCT/JP2009/068967, mail date is Jun. 30, 2011.

International Preliminary Report on Patentability for PCT/JP2009/071563, mail date is Aug. 25, 2011.

International Search Report for PCT/JP2009/071563, mail date is Mar. 23, 2010.

Office Action with respect to U.S. Appl. No. 13/127,304, mailed Jul. 16, 2013.

Office Action for Taiwanese Patent Application No. 098144836, which was mailed on Mar. 4, 2014.

Search Report issued in patent family member European Patent Application No. 09835011.9, mailed Aug. 3, 2012.

* cited by examiner

HYDROGENATION ISOMERIZATION CATALYST, METHOD FOR PRODUCING SAME, METHOD FOR DEWAXING HYDROCARBON OIL, AND METHOD FOR PRODUCING LUBRICANT BASE OIL

TECHNICAL FIELD

The present invention relates to a hydroisomerization catalyst, a method for producing the catalyst, a method for dewaxing a hydrocarbon oil using the hydroisomerization catalyst, and a method for producing a lubricant base oil.

BACKGROUND ART

Among petroleum products, for example, lubricant oils, gas oils, jet fuels, and the like are products in which cold flow property is considered to be important. For this reason, it is desirable that base oils used for these products be such that waxy components such as normal paraffins or slightly branched isoparaffins, which are responsible for being improved the cold flow property, have been completely or partially removed, or converted to components other than waxy components. Hydrocarbons obtained by Fischer-Tropsch synthesis (hereinafter sometimes referred to as "FT synthesis") have attracted attention as feedstocks for producing lubricant oils or fuels, because they do not contain substances of concern such as sulfur compounds; however, these hydrocarbons also contain many waxy components.

An example of a known dewaxing technique for removing waxy components from hydrocarbon oils is a method wherein waxy components are extracted using a solvent such as liquefied propane or MEK. However, this method has problems in that the operating costs are high, the types of usable feedstocks are limited, and the product yield is limited by the type of feedstock.

On the other hand, an example of a known dewaxing technique for converting waxy components in a hydrocarbon oil to non-waxy components is catalytic dewaxing in which the hydrocarbon oil is contacted, in the presence of hydrogen, over a bifunctional hydroisomerization catalyst capable of hydrogenation-dehydrogenation and isomerization, thereby isomerizing normal paraffins in the hydrocarbon oil to isoparaffins. Further, examples of known hydroisomerization catalysts used for catalytic dewaxing include catalysts containing solid acids, represented by for example, zeolites, and metals belonging to Groups 8 to 10 or Group 6 of the periodic table.

While catalytic dewaxing is an effective method for improving the cold flow property of hydrocarbon oils, it is necessary to sufficiently increase the normal paraffin conversion in order to obtain a fraction that is suitable for a lubricant base oil. However, because the hydroisomerization catalysts used in the catalytic dewaxing are capable of both isomerization and hydrocarbon cracking, the cracking reaction of the hydrocarbon oil into lighter products also proceeds as the normal paraffin conversion increases, reducing to yield a desired fraction. Particularly, when producing a high-quality lubricant base oil in which a high viscosity index and low pour point are required, it is necessary to increase the conversion to the extent that the normal paraffin is not substantially contained and is hence very difficult to economically obtain a desired fraction by the catalytic dewaxing of a hydrocarbon oil. For this reason, synthetic base oils such as polyalphaolefins have been frequently used in this field.

Under such circumstances, there is a need for a hydroisomerization catalyst having high isomerization activity while suppressing undesirable cracking, i.e., having excellent isomerization selectivity, for the purpose of obtaining a desired isoparaffin fraction in good yield from a hydrocarbon oil containing waxy components in the field of producing lubricant base oils and fuel base oils, particularly lubricant base oils.

Attempts to improve the isomerization selectivity of hydroisomerization catalysts used in catalytic dewaxing have been made in the past. For example, Patent Literatures 1 to 5 listed below discloses a method for producing a dewaxed lubricant oil, wherein a straight-chain or slightly branched hydrocarbon feedstock having 10 or more carbon atoms is contacted under isomerization conditions with a catalyst comprising a zeolite, such as ZSM-22, ZSM-23, or ZSM-48, having one-dimensional pores of an intermediate size and containing a metal of Groups 8 to 10 or the like of the periodic table, and having a crystallite size of no more than about 0.5µ.

It is noted that a zeolite that constitutes a hydroisomerization catalyst is typically produced by hydrothermal synthesis in the presence of an organic compound which is called an organic template having an amino group, ammonium group, or the like, in order to construct a predetermined porous structure. The synthesized zeolite is then calcined in an atmosphere containing molecular oxygen at a temperature of, for example, about 550° C. or more, to thereby remove the organic template contained therein, as described in, for example, the final paragraph of the "2.1. Materials" section on page 453 of the Non Patent Literature 1 listed below. Next, the calcined zeolite is typically ion-exchanged into an ammonium form in an aqueous solution containing ammonium ions, as described in, for example, the "2.3. Catalytic experiments" section on page 453 of the Non-Patent Literature 1. A metal components of Group 8 to 10 or the like of the periodic table is further supported on the ion-exchanged zeolite. The zeolite on which the metal component is supported is then subjected to steps such as drying, and optionally extruded, and then loaded in a reactor; the zeolite is typically calcined in an atmosphere containing molecular oxygen at a temperature of about 400° C., and is further subjected to reduction treatment with, for example, hydrogen, at about the same temperature; consequently, the zeolite is provided with catalytic activity as a bifunctional catalyst.

On the other hand, catalysts for commercial use is typically used in the form of a extruded product for the purpose of improving the handleability, reducing the pressure loss of a reaction fluid in the catalyst bed, and the like. However, zeolite powders have lower cracking activity and the mechanical strength of a catalyst prepared from a extruded product obtained by extruding only such a powder is small, hence making it difficult to apply for practical use. Consequently, catalysts in which zeolite is used are typically used in the form of a extruded product prepared by extruding a composition of zeolite powders to which an inorganic oxide powder called a binder is added.

CITATION LIST

Patent Literature

Patent Literature 1: U.S. Pat. No. 5,282,958
Patent Literature 2: Japanese Unexamined Patent Application Publication No. 2000-515185
Patent Literature 3: Japanese Unexamined Patent Application Publication No. 2001-525723
Patent Literature 4: Japanese Unexamined Patent Application Publication No. 2006-514086

Patent Literature 5: Japanese Unexamined Patent Application Publication No. 2006-523136

Non Patent Literature

Non Patent Literature 1: J. A. Martens et al., J. Catal. 239 (2006) 451

SUMMARY OF INVENTION

Technical Problem

An object of the present invention is to provide a hydroisomerization catalyst having higher isomerization selectivity and mechanical strengths that enables to produce a hydrocarbon oil suitable for a lubricant base oil and/or as a fuel base oil, especially as a high-quality lubricant base oil, stably in good yield from a hydrocarbon oil containing normal paraffins; a method for producing the hydroisomerization catalyst; a method for dewaxing a hydrocarbon oil using the hydroisomerization catalyst; and a method for producing a lubricant base oil using the hydroisomerization catalyst.

Another object of the present invention is to provide a hydroisomerization catalyst having higher isomerization selectivity and isomerization reaction activity that enables to produce a hydrocarbon oil suitable for a lubricant base oil and/or as a fuel base oil, especially as a high-quality lubricant base oil, stably in good yield from a hydrocarbon oil containing normal paraffins; a method for producing the hydroisomerization catalyst; a method for dewaxing a hydrocarbon oil using the hydroisomerization catalyst; and a method for producing a lubricant base oil using the hydroisomerization catalyst.

Solution to Problem

The present inventors studied the improvement of the isomerization selectivity of the hydroisomerization catalyst and found that the hydroisomerization catalyst obtained by calcining a catalyst composition containing an ion-exchanged zeolite obtained by ion exchange of an organic template-containing zeolite in a solution containing a cation seed or the calcined product thereof and at least one metal selected from the group consisting of metals belonging to Groups 8 to 10 of the periodic table of elements, molybdenum and tungsten supported on the ion-exchanged zeolite or the calcined product thereof has higher isomerization selectivity in the high normal paraffin conversion, whereby the patent application has been filed.

The present inventors conducted extensive research to solve the above-mentioned objects, and consequently found that a hydroisomerization catalyst containing a support containing a specific zeolite and a specific inorganic oxide and a specific active metal supported on such a support has sufficient mechanical strengths and higher isomerization selectivity at high normal paraffin conversion in the hydroisomerization reaction of a hydrocarbon oil containing normal paraffins, whereby the present invention has been accomplished.

More specifically, the present invention provides a first hydroisomerization catalyst which comprises a support being a extruded product prepared by calcination having a thermal treatment that includes thermally treating at 350° C. or more and at least one metal supported on the support and selected from the group consisting of metals belonging to Groups 8 to 10 of the periodic table, molybdenum and tungsten; wherein the support contains (a1) a calcined zeolite prepared by calcination having a thermal treatment that includes thermally treating at 350° C. or more of an ion-exchanged zeolite obtained by ion exchange of an organic template-containing zeolite containing an organic template and having a 10-membered ring one-dimensional porous structure in a solution containing ammonium ions and/or protons, and (b1) a calcined inorganic oxide prepared by calcination having a thermal treatment that includes thermally treating at 350° C. or more of at least one inorganic oxide selected from the group consisting of alumina, silica, titania, boria, zirconia, magnesia, ceria, zinc oxide, phosphorus oxide, and a composite oxide containing a combination of two or more of these oxides, wherein the thermal treatment to which the calcined zeolite has been subjected includes calcination of the ion-exchanged zeolite that has not been thermally treated at 350° C. or more by heating within the range of 350° C. to 450° C.

The periodic table as referred to herein represents the long form of the periodic table designated by the International Union of Pure and Applied Chemistry (IUPAC).

By the way, the process disclosed in the above-mentioned Patent Literature 1 has not provided sufficiently high isomerization selectivity of the catalyst or sufficiently suppressed cracking activity, thus making it difficult to obtain in good yield a desired isoparaffin fraction that is suitable for a lubricant base oil or fuel base oil from a hydrocarbon oil containing normal paraffin components. Particularly in the production of base oils for high-quality lubricant oils, it is necessary to increase the conversion of normal paraffins to a level such that the base oils are substantially free of normal paraffins. In this case, because the cracking reactions of normal paraffins and/or isomerized products, i.e., isoparaffins, actively take place, an intended isoparaffin fraction has not been produced in economical yield.

Further, to produce isoparaffins with economic rationality, it is vital for the hydroisomerization catalyst to have not only higher isomerization selectivity but also mechanical strengths capable for commercial use.

According to the first hydroisomerization catalyst of the present invention, having the above-mentioned component, both mechanical strengths and isomerization selectivity can be met at a high level and a hydrocarbon oil suitable for a lubricant base oil and/or as a fuel base oil, especially as a high-quality lubricant base oil, can be produced stably in good yield from a hydrocarbon oil containing normal paraffins.

It is preferred that the above-mentioned organic template-containing zeolite be at least one selected from the group consisting of a zeolite ZSM-22, a zeolite ZSM-23, and a zeolite ZSM-48 in view of having the crystal structure suitable for the selective hydrogenation of normal paraffins.

It is preferred that the above inorganic oxide be alumina in view of the further enhancement of isomerization selectivity and mechanical strengths of the catalyst.

It is preferred that the above support be a extruded product prepared by calcination having a thermal treatment which includes thermally treating within the range of more than 450° C. and 650° C. or less, in view of further improvement of the mechanical strengths of the catalyst while achieving higher isomerization selectivity.

In view of the isomerization selectivity and reaction activity, the metal supported on the support is preferably platinum and/or palladium.

In view of the isomerization selectivity and reaction activity, the molar ratio of silicon atoms to aluminum atoms ([Si]/[Al]) in the organic template-containing zeolite is preferably 10 to 400.

It is preferred that the above-mentioned organic template-containing zeolite be a crystal aggregate having a number average length of the longitudinal direction of 0.01 to 1 μm, in view of the isomerization selectivity and reaction activity.

Further, it is preferred that the above organic template-containing zeolite satisfy the following formula (B-I) in view of the hydroisomerization reaction activity.

$$0.8 \leq [Si/Al]_{XPS}/[Si/Al]_{XRF} \leq 1.0 \tag{B-I}$$

wherein $[Si/Al]_{XPS}$ represents a molar ratio of silicon atoms to aluminum atoms in the organic template-containing zeolite measured using an X-ray photoelectron spectroscopy analysis, and $[Si/Al]_{XRF}$ represents a molar ratio of silicon atoms to aluminum atoms in the organic template-containing zeolite measured using an X-ray fluorescence analysis.

The present invention also provides a method for producing the first hydroisomerization catalyst comprising: a first step of obtaining an ion-exchanged zeolite by ion exchange of an organic template-containing zeolite containing an organic template and having a 10-membered ring one-dimensional porous structure in a solution containing ammonium ions and/or protons; a second step of obtaining a extruded product by extruding a composition containing the ion-exchanged zeolite and at least one inorganic oxide selected from the group consisting of alumina, silica, titania, boria, zirconia, magnesia, ceria, zinc oxide, phosphorus oxide, and a composite oxide containing a combination of two or more of these oxides; a third step of obtaining a support by calcining the extruded product by thermally treating within the range of at least 350° C. to 450° C.; and a fourth step of supporting on the support at least one metal selected from the group consisting of metals belonging to Groups 8 to 10 of the periodic table, molybdenum and tungsten.

According to the method for producing the first hydroisomerization catalyst of the present invention, having the above-mentioned steps can provide the hydroisomerization catalyst which enables obtaining a hydrocarbon oil good in both isomerization selectivity and mechanical strengths and suitable for a lubricant base oil and/or as a fuel base oil, especially as a high-quality lubricant base oil, stably in good yield from a hydrocarbon oil containing normal paraffins.

In the method for producing the first hydroisomerization catalyst of the present invention, it is preferred, in view of the further improvement of the catalyst mechanical strengths, that the above third step be a step of obtaining the above-mentioned support by calcining the above extruded product with thermally treating within the range of at 350° C. to 450° C., subsequently thermally treating within the range of more than 450° C. and 650° C. or less.

Further, the present invention provides a first method for dewaxing a hydrocarbon oil comprising contacting, in the presence of hydrogen, a hydrocarbon oil containing normal paraffins having 10 or more carbon atoms, with the above-described first hydroisomerization catalyst of the present invention, thereby converting a portion or all of the normal paraffins to isoparaffins.

The hydrocarbon oil is preferably at least one selected from the group consisting of vacuum gas oils, hydrocracked residual oils of vacuum gas oils, slack waxes, deoiled waxes, paraffinic waxes, microcrystalline waxes, petrolatum, and Fischer-Tropsch synthesis waxes.

Further, the present invention provides a first method for producing a lubricant base oil comprising contacting, in the presence of hydrogen, a hydrocarbon oil containing normal paraffins having 10 or more carbon atoms, with the first hydroisomerization catalyst of the present invention, or a hydroisomerization catalyst obtained by the first, second, or third process of the present invention, under conditions that give substantially 100 mass % conversion of the normal paraffins, as defined by the following expression (A-I):

[Expression 1]

Normal paraffin conversion (%) = (A-I)

$$\left[ 1 - \left( \frac{\begin{array}{c} \text{Total mass of the} \\ \text{normal paraffins having} \\ Cn \text{ or more} \\ \text{contained in the} \\ \text{hydrocarbon oil} \\ \text{after contacting} \end{array}}{\begin{array}{c} \text{Total mass of the} \\ \text{normal paraffins having} \\ Cn \text{ or more} \\ \text{contained in the} \\ \text{hydrocarbon oil} \\ \text{before contacting} \end{array}} \right) \right] \times 100$$

wherein Cn represents a minimum number of carbon atoms of the normal paraffins having 10 or more carbon atoms contained in the hydrocarbon oil before contacting.

Further, the present inventors conducted extensive research to solve the above-mentioned another object of the present invention, and consequently found that the hydroisomerization catalyst containing a calcined specific zeolite and a calcined inorganic porous oxide and a specific active metal supported on them exhibits a high isomerization reaction activity in the hydroisomerization reaction of a hydrocarbon oil containing normal paraffins together with higher isomerization selectivity at a high normal paraffin conversion, whereby the present invention has been accomplished.

More specifically, the present invention provides a second hydroisomerization catalyst comprising a calcined zeolite (a2) prepared by calcination of an ion-exchanged zeolite obtained by ion exchange of an organic template-containing zeolite being a crystal aggregate having a number average length of the longitudinal direction of 0.01 to 1 μm and having a 10-membered ring one-dimensional porous structure in a solution containing ammonium ions and/or protons, a calcined inorganic porous oxide (b2), and at least one metal (c) selected from the group consisting of metals belonging to Groups 8 to 10 of the periodic table, molybdenum and tungsten supported on the calcined zeolite and/or the inorganic porous oxide.

However, in the methods described in the above Patent Documents 1 to 5, since the isomerization selectively of the catalysts was not satisfactory and the cracking activity was not suppressed enough, it was difficult to obtain a desired isoparaffin fraction suitable for a lubricant base oil or a fuel base oil stably in good yield from a hydrocarbon oil containing normal paraffin components. Particularly, in the production of high-performance lubricant base oils, it is necessary to increase the conversion to the extent that the normal paraffin is not substantially contained, and, in such a case, the cracking reaction of normal paraffins and/or isoparaffins, i.e., an isomerization product, becomes active, thereby failing to obtain a desired isoparaffin fraction in economic yield.

Further, considering the processing efficiency such as assuring a production speed per predetermined unit time at a production facility having a predetermined size, it is necessary to not only enhance the isomerization selectivity of the hydroisomerization catalyst but also sufficiently enhance the isomerization reaction activity.

The second hydroisomerization catalyst of the present invention can have both the isomerization reaction activity and the isomerization selectivity sufficiently high to normal paraffins by having the above-mentioned configuration. Thus, while suppressing the cracking reaction of hydrocarbon, it becomes possible to more efficiently isomerize normal paraffins to isoparaffins, enabling obtaining a desired hydrocarbon fraction in higher yield. According to the hydroisomerization catalyst of the present invention, it is possible to obtain a hydrocarbon oil suitable for a lubricant base oil and/or as a fuel base oil, especially as a high-quality lubricant base oil, stably in good yield from a hydrocarbon oil containing normal paraffins.

In view of high isomerization selectivity in the hydroisomerization reaction of normal paraffins, it is preferred that the above-mentioned organic template-containing zeolite be at least one selected from the group consisting of a zeolite ZSM-22, a zeolite ZSM-23, and a zeolite ZSM-48.

It is preferred that the above organic template-containing zeolite satisfy the following formula (B-I) in view of the hydroisomerization reaction activity.

$$0.8 \leq [Si/Al]_{XPS}/[Si/Al]_{XRF} \leq 1.0 \quad \text{(B-I)}$$

wherein $[Si/Al]_{XPS}$ represents a molar ratio of silicon atoms to aluminum atoms in the organic template-containing zeolite measured using an X-ray photoelectron spectroscopy analysis, and $[Si/Al]_{XRF}$ represents a molar ratio of silicon atoms to aluminum atoms in the organic template-containing zeolite measured using an X-ray fluorescence analysis.

In view of the isomerization selectivity and the reaction activity, it is preferred that the above-mentioned metal (c) be platinum and/or palladium.

In view of the isomerization selectivity, it is preferred that the above inorganic porous oxide (b2) be alumina.

In view of the isomerization selectivity, it is preferred that the above-mentioned calcined zeolite be prepared by calcination of the ion-exchanged zeolite with a thermal treatment which includes thermally treating at 350° C. or more and that the thermal treatment includes calcination of the ion-exchanged zeolite that has not been thermally treated at 350° C. or more by heating within the range of 350° C. to 450° C.

The present invention also provides a method for producing the second hydroisomerization catalyst comprising a first step of obtaining an ion-exchanged zeolite by ion exchange of an organic template-containing zeolite being a crystal aggregate having a number average length of the longitudinal direction of 0.01 to 1 μm and having a 10-membered ring one-dimensional porous structure in a solution containing ammonium ions and/or protons; a second step of obtaining a extruded product by extruding a composition containing the above ion-exchanged zeolite and an inorganic porous oxide; a third step of obtaining a support by calcining the above extruded product with thermally treating within the range of at least 350° C. to 450° C.; and a fourth step of supporting on the support at least one metal selected from the group consisting of metals belonging to Groups 8 to 10 of the periodic table, molybdenum and tungsten.

According to the method for producing the second hydroisomerization catalyst of the present invention, having the above-mentioned steps can provide the hydroisomerization catalyst which enables obtaining a hydrocarbon oil good in both isomerization selectivity and the isomerization reaction activity and suitable for a lubricant base oil and/or as a fuel base oil, especially as a high-quality lubricant base oil, stably in good yield from a hydrocarbon oil containing normal paraffins.

The present invention further provides a method for dewaxing the second hydrocarbon oil comprising contacting, in the presence of hydrogen, a hydrocarbon oil containing normal paraffins having 10 or more carbon atoms, with the second hydroisomerization catalyst of the present invention described above, thereby converting a portion or all of the normal paraffins to isoparaffins.

It is preferred for the above hydrocarbon oil to be at least one selected from the group consisting of vacuum gas oils, hydrocracked vacuum residual oils, slack waxes, deoiled waxes, paraffinic waxes, microcrystalline waxes, petrolatum, and Fischer-Tropsch synthesis waxes.

The present invention also provides a method for producing a second lubricant base oil comprising contacting, in the presence of hydrogen, a hydrocarbon oil containing normal paraffins having 10 or more carbon atoms, with the second hydroisomerization catalyst of the present invention described above under conditions that give substantially 100 mass % conversion of the above normal paraffins, as defined by the following expression (B-II):

[Expression 2]

$$\text{Normal paraffin conversion (\%)} = \left[ 1 - \left( \frac{\begin{array}{c} \text{Total mass of the} \\ \text{normal paraffins having} \\ Cn \text{ or more} \\ \text{contained in the} \\ \text{hydrocarbon oil} \\ \text{after contacting} \end{array}}{\begin{array}{c} \text{Total mass of the} \\ \text{normal paraffins having} \\ Cn \text{ or more} \\ \text{contained in the} \\ \text{hydrocarbon oil} \\ \text{before contacting} \end{array}} \right) \right] \times 100 \quad \text{(B-II)}$$

wherein Cn represents a minimum number of carbon atoms of the normal paraffins having 10 or more carbon atoms contained in the hydrocarbon oil before contacting.

Advantageous Effects of Invention

According to the present invention, a hydroisomerization catalyst having higher hydroisomerization selectivity and mechanical strengths and a method for producing the catalyst can be provided. Further, according to the present invention, using the hydroisomerization catalyst, there can be provided a method for dewaxing a hydrocarbon oil which enables obtaining a hydrocarbon oil suitable for a lubricant base oil and/or a fuel base oil from a hydrocarbon oil containing normal paraffins stably in high yield as well as a method for producing a lubricant base oil which enables obtaining a high-performance lubricant base oil in high yield from a hydrocarbon oil containing normal paraffins.

Furthermore, according to the present invention, a hydroisomerization catalyst having higher hydroisomerization selectivity and hydroisomerization reaction activity and a method for producing the catalyst can be provided. Still furthermore, according to the present invention, using the hydroisomerization catalyst, there can be provided a method for dewaxing a hydrocarbon oil which enables obtaining a hydrocarbon oil suitable for a lubricant base oil and/or a fuel base oil from a hydrocarbon oil containing normal paraffins stably in high yield as well as a method for producing a lubricant base oil which enables obtaining a high-performance lubricant base oil in high yield from a hydrocarbon oil containing normal paraffins.

DESCRIPTION OF EMBODIMENTS

<The First Hydroisomerization Catalyst>

Figure 1:
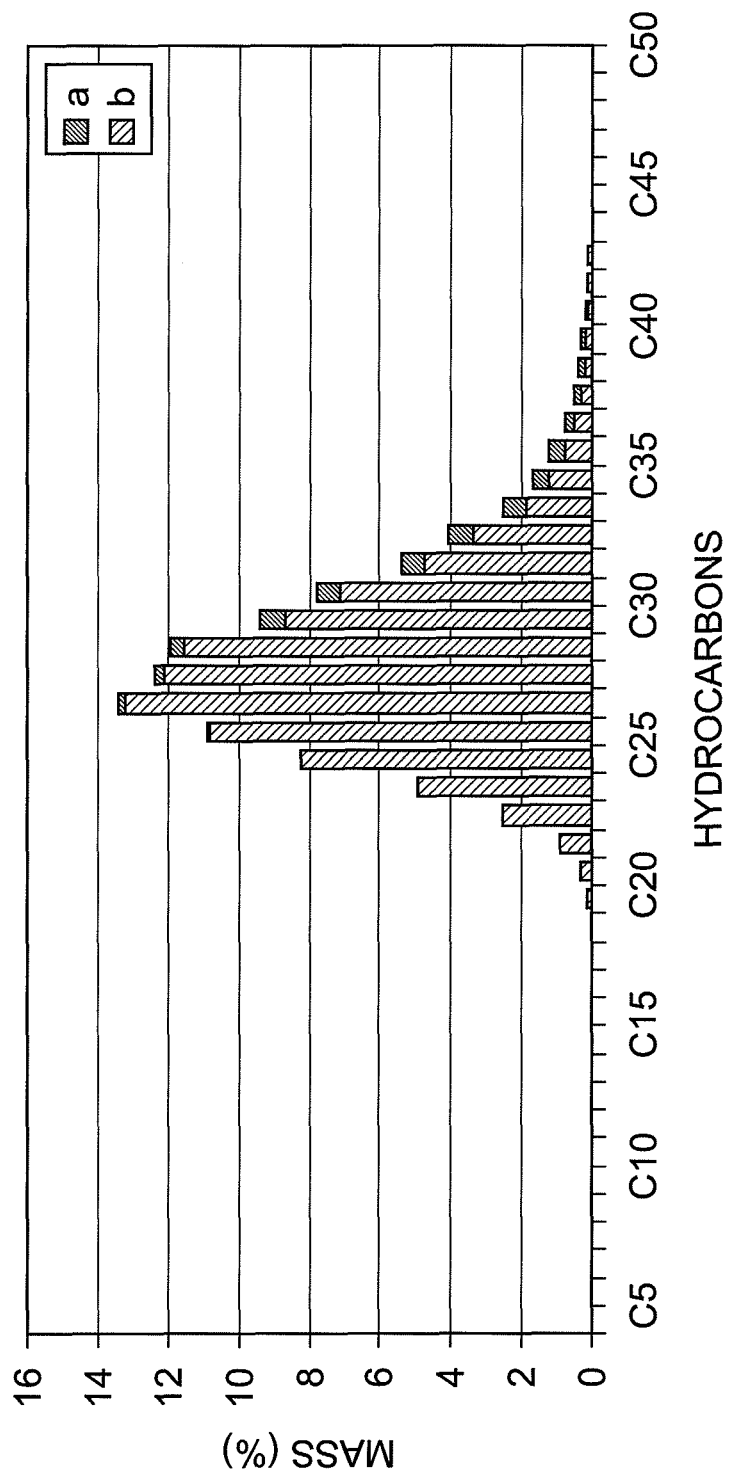
FIG. 1 is a graph showing the composition of a petroleum wax subjected to the dewaxing treatment by the hydroisomerization reaction.

The first hydroisomerization catalyst of the present invention is imparted with the features thereof by being produced by the specific process. Hereinafter, the first hydroisomerization catalyst of the present invention is described with reference to preferred embodiments of the production thereof.

The organic template-containing zeolite, which is used as a starting material of a calcined zeolite (a1) which constitutes the first hydroisomerization catalyst of the present invention, preferably has a one-dimensional porous structure made of a 10-membered ring, in view of achieving a high level of both high isomerization activity and suppressed cracking activity in the hydroisomerization reactions of normal paraffins. Examples of such zeolites include AEL, EUO, FER, HEU, MEL, MFI, NES, TON, MTT, WEI, and ZSM-48. It is noted that the above three alphabet letters designate framework-type codes assigned to various structures of classified molecular sieve-type zeolites by the Structure Commission of the International Zeolite Association. It is also noted that zeolites having the same topology are collectively designated by the same code.

Among the above-mentioned zeolites having 10-membered ring one-dimensional porous structures, preferred as the organic template-containing zeolite are zeolites having the TON and MTT structures, and zeolite ZSM-48, in view of high isomerization activity and low cracking activity. Zeolite ZSM-22 is more preferred among zeolites having the TON structure, and zeolite ZSM-23 is more preferred among zeolites having the MTT structure.

The organic template-containing zeolite containing an organic template and having a 10-membered ring one-dimensional porous structure, which is used as a starting material of the calcined zeolite (a1) that constitutes the first hydroisomerization catalyst of the present invention, is hydrothermally synthesized according to a known method using a silica source, an alumina source, and an organic template that is added to construct the predetermined porous structure described above.

The organic template is an organic compound having an amino group, ammonium group, or the like, and is selected according to the structure of the zeolite to be synthesized; however, the organic template is preferably an amine derivative. Specifically, the organic template is preferably at least one selected from the group consisting of alkylamines, alkyldiamines, alkyltriamines, alkyltetramines, pyrrolidine, piperazine, aminopiperazine, alkylpentamines, alkylhexamines, and their derivatives.

The molar ratio of the silicon element to aluminum element ([Si]/[Al]; hereinafter referred to as the "Si/Al ratio") that constitute the organic template-containing zeolite having a 10-membered ring one-dimensional porous structure is preferably 10 to 400, and more preferably 20 to 350. If the Si/Al ratio is less than 10, although the activity for the conversion of normal paraffins increases, the isomerization selectivity to isoparaffins tends to decrease, and cracking reactions tend to sharply increase as the reaction temperature increases, which is undesirable. Conversely, if the Si/Al ratio is more than 400, catalytic activity needed for the conversion of normal paraffins cannot be easily obtained, which is undesirable.

In the present embodiment, when synthesized, it is preferred that the number average length of the longitudinal direction of the crystal aggregate be adjusted to 0.01 to 1 μm by controlling the size of the crystal aggregate. The phrase "crystal aggregate" as referred to herein means an aggregate in which a plurality of zeolite crystallites are held together. Further, these crystals are needle crystals, and the phrase "number average length of the longitudinal direction" means an average length of the longitudinal direction of the needle crystal. The number average length of the longitudinal direction of the crystal aggregate is determined by measuring each length of the long axis of randomly selected 100 crystal aggregates from the image taken at a magnification of 50000 times of a spontaneous scope observed using a scanning electron microscope (hereinafter sometimes referred to as "SEM"), whereby the arithmetic mean value of these measured lengths is taken.

In the case where a number average length of the longitudinal direction of the crystal aggregate is smaller than 0.01 μm, the mechanical strength of the crystal is low and the crystal breaks by a mechanical or thermal treatment likely causing the isomerization reaction activity to reduce, whereas in the case where a number average length exceeds 1 μm, the hydroisomerization activity of the hydroisomerization catalyst tends not to sufficiently enhance, hence not preferable.

As a method for controlling the size of the crystal aggregate within the above range, methods by which the crystal growth is suppressed are typically employed. Among these, in a reactor in which the synthesis of the zeolite is carried out, it is preferred to mix the reaction mixture at a high speed. In the case where the reactor is equipped with a stirrer, it is preferred to increase the number of rotations of the stirrer, in the case where the reactor is equipment in which the reaction mixture is mixed by rotating or vibrating the reactor itself, it is preferred to increase the number of rotation or the number of vibration thereof. Since the methods for stirring and mixing the reaction mixture and the efficiency thereof vary depending on the equipment for the zeolite synthesis, it is difficult to specifically define the number of rotations or the number of vibrations of a stirrer or a reactor itself. As an example, in the case where tumbling is typically carried out at a rotational frequency of 30 rpm in the equipment in which the mixing of contents is carried out by tumbling a reactor itself, the size of the crystal aggregate can be adjusted to a predetermined size by changing the rotational frequency to 60 rpm.

It is preferred that the organic template-containing zeolite satisfy the following formula (B-I).

$$0.8 \leq [Si/Al]_{XPS}/[Si/Al]_{XRF} \leq 1.0 \qquad \text{(B-I)}$$

wherein $[Si/Al]_{XPS}$ represents a molar ratio of silicon atoms to aluminum atoms in the organic template-containing zeolite measured using an X-ray photoelectron spectroscopy analysis, and $[Si/Al]_{XRF}$ represents a molar ratio of silicon atoms to aluminum atoms in the organic template-containing zeolite measured using an X-ray fluorescence analysis.

X-ray photoelectron spectroscopy analysis (hereinafter sometimes referred to as "XPS") is a technique for analyzing the atoms present only at a portion very near to the solid surface, whereas X-ray fluorescence analysis (hereinafter sometimes referred to as "XRF") is a technique for analyzing the atoms present at the solid surface to those present at a portion deep therefrom when compared with XPS. Generally, he silicon atom and the aluminum atom composing a zeolite are often found to have a different constituent ratio between the surface and the interior of the zeolite crystal. More specifically, in proximity to the crystal surface, the constituent molar ratio of the silicon atom and the aluminum atom (Si/Al) is small compared to the crystal interior, in other words, in proximity to the crystal surface, it is common that the ratio of the aluminum atom is relatively higher compared with the interior. In this case, the value of $[Si/Al]_{XPS}/[Si/Al]_{XRF}$ becomes small. To the contrary, in the case where the ratio of the aluminum atom at the crystal surface is closer to that of the crystal interior, the value of $[Si/Al]_{CPS}/[Si/Al]_{XRF}$ becomes closer to 1. As a result, it shows that the closer the value of $[Si/Al]_{XPS}/[Si/Al]_{XRF}$ is to 1, the more uniform the composition of the crystal surface and the crystal interior is.

In the case where the $[Si/Al]_{XPS}/[Si/Al]_{XRF}$ value of the organic template-containing zeolite is below 0.8, it is not preferable because the isomerization activity of normal paraffins have a small improvement effect. Further, it is difficult to synthesize a zeolite having the above value exceeding 1.0.

As a method for controlling $[Si/Al]_{XPS}/[Si/Al]_{XRF}$ of the organic template-containing zeolite within the above range, examples include changing the amount ratio of a silica source to an alumina source at the time of the zeolite synthesis and changing the mixing speed of the reaction mixture. As a specific example, when an amount of an alumina source is increased to an amount of a silica source or a mixing speed of the reaction mixture is increased, the $[Si/Al]_{XPS}/[Si/Al]_{XRF}$ value tends to increase.

The synthesized organic template-containing zeolite, which has preferably been washed and dried, typically has alkali metal cations as counter cations, and incorporates the organic template in its porous structure. The zeolite containing an organic template, which is used for producing the first hydroisomerization catalyst of the present invention, is preferably in such a synthesized state, i.e., preferably, the zeolite has not been subjected to calcination treatment for removing the organic template incorporated therein.

The organic template-containing zeolite is subsequently ion-exchanged in a solution containing ammonium ions and/or protons. By the ion-exchange treatment, the counter cations contained in the organic template-containing zeolite are exchanged into ammonium ions and/or protons. At the same time, a portion of the organic template incorporated in the organic template-containing zeolite is removed.

The solution used for the ion-exchange treatment is preferably a solution that uses a solvent containing at least 50 vol % of water, and more preferably an aqueous solution. Examples of compounds for supplying ammonium ions into the solution include various inorganic and organic ammonium salts, such as ammonium chloride, ammonium sulfate, ammonium nitrate, ammonium phosphate, and ammonium acetate. On the other hand, mineral acids such as hydrochloric acid, sulfuric acid, and nitric acid are typically used as compounds for supplying protons into the solution. The ion-exchanged zeolite (herein, an ammonium-form zeolite) obtained by ion exchange of the organic template-containing zeolite in the presence of ammonium ions releases ammonia during subsequent calcination, and the counter cations are converted into protons to form Bronsted acid sites. Ammonium ions are preferred as the cationic species used for the ion exchange. The amount of ammonium ions and/or protons contained in the solution is preferably adjusted to 10 to 1000 equivalents relative to the total amount of the counter cations and organic template contained in the organic template-containing zeolite used.

The ion-exchange treatment may be applied to the organic template-containing zeolite alone in powder form; alternatively, prior to the ion-exchange treatment, the organic template-containing zeolite may be mixed with an inorganic oxide, which is a binder, and extruded, and the ion-exchange treatment may be applied to the resulting extruded product. However, if the extruded product in its uncalcined state is subjected to the ion-exchanged treatment, the problem of collapsing and powdering of the extruded product will easily arise; therefore, it is preferred to subject the organic template-containing zeolite in powder form to the ion-exchange treatment.

The ion-exchange treatment is preferably performed according to a standard method, i.e., a method in which the organic template-containing zeolite is immersed in a solution, preferably an aqueous solution, containing ammonium ions and/or protons, and the solution is stirred and fluidized. The stirring or fluidization is preferably performed under heating to improve the ion-exchange efficiency. In the present invention, it is particularly preferred to use a method in which the aqueous solution is heated, boiled, and ion-exchanged under reflux.

Further, in view of improving the ion-exchange efficiency, during the ion exchange of the zeolite in a solution, the solution is preferably exchanged with a fresh one once or twice or more, and more preferably exchanged with a fresh one once or twice. When the solution is exchanged once, the ion-exchange efficiency can be improved by, for example, immersing the organic template-containing zeolite in a solution containing ammonium ions and/or protons, and heating the solution under reflux for 1 to 6 hours, followed by exchanging the solution with a fresh one, and further heating under reflux for 6 to 12 hours.

By the ion-exchange treatment, substantially all of the counter cations such as an alkali metal in the zeolite can be exchanged into ammonium ions and/or protons. On the other hand, with respect to the organic template incorporated in the zeolite, although a portion of the organic template is removed by the ion-exchange treatment, it is generally difficult to remove all of the organic template even if the ion-exchange treatment is repeatedly performed, resulting in a portion of the organic template remaining inside the zeolite.

Next, it is preferred to mix the ion-exchanged zeolite obtained by the above-described method with an inorganic oxide, which is a binder, and extrude the resulting composition to form a extruded product. The purpose of mixing the ion-exchanged zeolite with an inorganic oxide is to increase the mechanical strength of the support (in particular, a particulate support) obtained by calcining the extruded product to a degree that can withstand practical applications; however, the present inventors have found that the selection of the type of inorganic oxide affects the isomerization selectivity of the hydroisomerization catalyst. From this viewpoint, at least one inorganic oxide selected from alumina, silica, titania, boria, zirconia, magnesia, ceria, zinc oxide, phosphorus oxide, and a composite oxide containing a combination of at least two or more of these oxides can be used as the inorganic oxide. Among the above, alumina is preferred in view of further improving the isomerization selectivity of the hydroisomerization catalyst. The phrase "composite oxide containing a combination of at least two or more of these oxides" is a composite oxide containing at least two components from alumina, silica, titania, boria, zirconia, magnesia, ceria, zinc oxide, and phosphorus oxide, but is preferably an alumina-based composite oxide containing 50 mass % or more of an alumina component based on the composite oxide.

The proportion of the ion-exchanged zeolite to the inorganic oxide in the above-mentioned composition is preferably 10:90 to 90:10, and more preferably 30:70 to 85:15, in terms of the mass ratio of the ion-exchanged zeolite to the inorganic oxide. If this ratio is less than 10:90, the activity of the hydroisomerization catalyst tends to be insufficient, which is undesirable. Conversely, if the ratio is more than 90:10, the mechanical strength of the support obtained by extruding and calcining the composition tends to be insufficient, which is undesirable.

Although the method for mixing the ion-exchanged zeolite with the inorganic oxide is not particularly limited, a general method can be employed, such as, for example, a method in which a suitable amount of a liquid such as water is added to the powders of both components to form a viscous fluid, and the fluid is kneaded in a kneader or the like.

The composition containing the ion-exchanged zeolite and inorganic oxide, or a viscous fluid containing the composition, is extruded by extrusion or other methods, and is preferably dried, to form a particulate extruded product. Although the shape of the extruded product is not particularly limited, the extruded product may, for example, have a cylindrical shape, pellet shape, spherical shape, or irregular tubular shape having a three leaf-shaped or four leaf-shaped cross section. Although the size of the extruded product is not particularly limited, the extruded product is preferably, for example, about 1 to 30 mm in long axis, and about 1 to 20 mm in short axis, in view of the ease of handling, the load density in the reactor, etc.

Next, the thus-obtained extruded product is preferably calcined in an atmosphere containing molecular oxygen, at a temperature of 350 to 450° C., preferably 380 to 430° C., and more preferably 390 to 420° C., to give a calcined support having a thermal treatment that includes thermally treating at 350° C. or more. The phrase "in an atmosphere containing molecular oxygen" means contacting the extruded product with gases containing oxygen gas, and, particularly preferably with air. The calcination time is not particularly limited, but is preferably 1 to 24 hours.

By the calcination described above, the ion-exchanged zeolite that constitutes the extruded product turns into a calcined zeolite (a1), and the inorganic oxide turns into a calcined inorganic oxide (b1).

In this embodiment, if the calcination temperature is lower than 350° C., the removal of the organic template tends not to proceed sufficiently, or the removal tends to require a long time, and further, the mechanical strength of the support tends not to be improved sufficiently, which is undesirable. Conversely, if the calcination temperature is higher than 450° C., the isomerization selectivity of the resulting hydroisomerization catalyst tends not to be improved sufficiently, which is undesirable. It is extremely important to calcine the ion-exchanged zeolite that has not been thermally treated at 350° C. or more and containing residual organic template at a relatively low temperature as defined above, in order to improve the isomerization selectivity of the first hydroisomerization catalyst of the present invention.

As described above, the ion-exchanged zeolite alone in powder form may be calcined as an alternative to calcining the extruded product obtained by extruding the composition prepared by mixing the ion-exchanged zeolite with the inorganic oxide. In this case, however, it is necessary to calcine a extruded product obtained by extruding a composition prepared by mixing the resulting calcined zeolite with an inorganic oxide at a temperature of 350° C. or more, for example, at a temperature within the range from 350 to 450° C. and/or within the temperature of more than 450° C. and 650° C. or less, for the purpose of imparting mechanical strength to the extruded product.

The support may be calcined by thermally treating within the temperature range from 350 to 450° C., and by further thermally treating within the temperature range of more than 450° C. and 650° C. or less, preferably in an atmosphere containing molecular oxygen, and more preferably in an air atmosphere. The calcination by further thermally treating at more than 450° C. and 650° C. or less, in addition to thermally treating at 350 to 450° C., allows the mechanical strength of the support to be further improved, without significantly affecting the hydroisomerization selectivity of the resulting catalyst. Therefore, when catalyst particles having a higher mechanical strength are desired, it is preferred to perform calcination by the two-stage thermally treating described above. If the thermally treating temperature in the subsequent stage is 450° C. or less, it tends to be difficult to further improve the mechanical strength of the support. Conversely, if the thermally treating temperature in the subsequent stage is more than 650° C., the environment of the aluminum atoms that involve the formation of active sites on the zeolite tends to change, resulting in increased cracking activity, which is undesirable. Further, in view of maintaining the isomerization selectivity, the thermally treating temperature in the subsequent stage is more preferably a temperature within the range of more than 450° C. and 600° C. or less.

In this embodiment, it is preferred that at least one metal (hereinafter sometimes referred to as an "active metal") selected from the group consisting of metals belonging to Groups 8 to 10 of the periodic table, molybdenum and tungsten is supported on the support which is the thus-obtained calcined extruded product having a thermal treatment that includes thermally treating at 350° C. or more.

Examples of metals belonging to Groups 8 to 10 of the periodic table include iron, ruthenium, osmium, cobalt, rhodium, iridium, nickel, palladium, and platinum. Among these metals, platinum and/or palladium is preferred, and platinum is particularly preferred, in view of the activity, isomerization selectivity, and durability of activity. The above-mentioned active metals can be used alone or in a combination of two or more. Moreover, when the hydroisomerization catalyst of the present invention is used for hydroisomerization of a hydrocarbon oil containing many ion-containing compounds and/or nitrogen-containing compounds, it is preferred that the active metal is a combination such as nickel-cobalt, nickel-molybdenum, cobalt-molybdenum, nickel-molybdenum-cobalt, or nickel-tungsten-cobalt, in view of the durability of catalytic activity.

The method for supporting the above-mentioned active metal on the support is not particularly limited; known methods are employed, such as impregnation methods (equilibrium adsorption, pore filling, and incipient wetting) using compounds containing the above-mentioned active metal elements (hereinafter sometimes referred to as "active metal precursors"), ion-exchange methods, and the like.

Examples of active metal precursors include hydrochlorides, sulfates, nitrates, and complex compounds of the above-mentioned active metals. When the active metal is platinum, active metal precursors that are preferably used include chloroplatinic acid, tetraamminedinitroplatinum, dinitroaminoplatinum, and tetraamminedichloroplatinum.

The total amount of the active metal supported on the support containing the calcined zeolite (a1) and the calcined inorganic oxide (b1) is preferably 0.001 to 20 mass %, based on the mass of the support. If the total amount of the supported metal is less than 0.001 mass %, it will be difficult to impart a predetermined hydrogenation/dehydrogenation function to the catalyst. Conversely, if the amount of the supported metal is more than 20 mass %, conversion of hydrocarbons into lighter products on the active metal by cracking tends to easily proceed, causing the yield of a desired fraction to decrease, and further causing the catalyst costs to increase, which is undesirable.

The active metal may be supported on either one or both of the calcined zeolite (a1) that constitutes the support and the calcined inorganic oxide (b1). When the hydroisomerization catalyst of the present invention is produced by a method in which an active metal is supported on the support by, for example, an impregnation method, the distribution of sites on which the active metal is supported is mainly determined by the affinity between the active metal precursor used in the supporting, and the calcined zeolite (a1) and calcined inorganic oxide (b1).

The supporting of an active metal is not limited to an embodiment in which the active metal is supported on the extruded and calcined support. For example, an active metal may be supported on the ion-exchanged zeolite in powder form, or on the calcined zeolite obtained by calcining the ion-exchanged zeolite at a temperature of 350 to 450° C., or may be supported on the inorganic oxide in power form; alternatively, an active metal may be supported on both of the zeolite and inorganic oxide.

It is preferred that the support on which the active metal component is supported be calcined preferably in an atmosphere containing molecular oxygen, mainly for the purpose of removing the anionic component or ligand component contained in the active metal precursor. The calcination temperature is preferably 250 to 600° C., and more preferably 300 to 500° C. The atmosphere containing molecular oxygen is preferably air. The calcination time is typically about 0.5 to 20 hours. By calcination treatment as described above, the active metal precursor is converted into an elemental metal, its oxide, or a similar species.

As described above, the preferred embodiment for producing the first hydroisomerization catalyst of the present invention comprises the steps of "ion-exchanging of the organic template-containing zeolite", "extruding the composition containing the ion-exchanged zeolite and an inorganic oxide", "calcining the extruded product by thermally treating at 350 to 450° C." or "calcining the extruded product by thermally treating at 350 to 450° C. and consequently thermally treating at more than 450° C. and 650° C. or less", supporting an active metal on the support", and "calcining the support on which the active metal is supported".

The essential features in the first hydroisomerization catalyst of the present invention lie in the following three points, in addition to the use of the above specific zeolite, the specific inorganic oxide and the specific active metal; "a portion of the organic template contained in the organic template-containing zeolite containing the organic-template is removed by ion exchange, not by calcination", "the ion exchange zeolite that has not been thermally treated at 350° C. or more and in which a portion of the organic template remains is calcined at a comparatively low temperature of 350 to 450° C., thereby removing at least a portion of the organic template remained in the zeolite" and "the support is a extruded product calcined with a thermal treatment including thermally treating at 350° C. or more" in the method for producing the catalyst. In producing the first hydroisomerization catalyst of the present invention, the embodiments and procedural steps thereof for carrying out each steps described above may be different from the above described preferred embodiments of the production and can be suitably varied insofar as the above three points are assured and within a range which does not pose problems in each step of producing the catalyst or invite an increase of the production cost due to more complicated steps.

It is preferred that, subsequent to the calcination treatment, the first hydroisomerization catalyst of the present invention be subjected to reduction treatment, preferably after the catalyst is loaded in the reactor for conducting the hydroisomerization reaction. Specifically, the reduction treatment is preferably performed for about 0.5 to 5 hours in an atmosphere containing molecular hydrogen, and preferably under a stream of hydrogen gas, preferably at 250 to 500° C., and more preferably at 300 to 400° C. This step further ensures that high activity for dewaxing a hydrocarbon oil can be imparted to the catalyst.

In the first hydroisomerization catalyst of the present invention, a metal other than the metals belonging to Groups 8 to 10 of the periodic table, molybdenum, and tungsten may further be supported on the calcined zeolite and/or calcined inorganic oxide, within a range such that the effects of the present invention are not impaired.

<Method for Producing the First Hydroisomerization Catalyst>

An example of the method for producing the first hydroisomerization catalyst of the present invention includes the process described as the procedural steps for achieving the above-described preferred embodiments of the first hydroisomerization catalyst of the present invention.

<Method for Dewaxing a First Hydrocarbon Oil>

Next, the method for dewaxing a first hydrocarbon oil is described. The method for dewaxing a first hydrocarbon oil of the present invention comprises the step of contacting, in the presence of hydrogen, a hydrocarbon oil containing normal paraffins having 10 or more carbon atoms, with the first hydroisomerization catalyst of the present invention, thereby converting a portion or all of the normal paraffins to isoparaffins.

The hydrocarbon oil that is subjected to the method for dewaxing a first hydrocarbon oil of the present invention is not particularly limited as long as it contains normal paraffins having 10 or more carbon atoms; preferably, the hydrocarbon oil contains normal paraffins having 15 or more carbon atoms. Specific examples of hydrocarbon oils include various hydrocarbon oils ranging from relatively light distillate fractions such as kerosenes and jet fuels, to high boiling feedstocks such as whole crude petroleum, reduced crudes, vacuum tower residual oils, vacuum residual oils, cycle oils, synthetic crudes (e.g., shale oils, tar oils, etc.), gas oils, vacuum gas oils, hydrocracked residual oils of vacuum gas oils, foot's oils, fuel fractions or waxy components derived from FT synthesis oils, and other heavy oils. These hydrocarbon oils may also contain, in addition to normal paraffins, waxy components composed of naphthenic hydrocarbons having long straight-chain alkyl groups on side chains, or aromatic hydrocarbons.

Particularly preferred as hydrocarbon oils to be dewaxed by the method for dewaxing a first hydrocarbon oil of the present invention are hydrocarbon oils composed of hydrocarbons having boiling points of about 180° C. or more, and having 10 or more carbon atoms. Hydrocarbon oils lighter than these hydrocarbon oils typically contain substantially no waxy components that affect the cold flow property; therefore, the need to dewax these hydrocarbon oils is low, and hence, the effects of the present invention are unlikely achieved.

Conversely, it is particularly effective to apply the dewaxing method of the present invention to distillate feedstocks containing waxy components such as middle distillate feedstocks including gas oils, kerosenes, and jet fuels, lubricant oil feedstocks, heating oils, and other distillate fractions whose pour point and viscosity need to be maintained within a predetermined range. Examples of such hydrocarbon oils include hydroprocessed or hydrocracked gas oils, heavy gas oils, vacuum gas oils, hydrocracked residual oils of vacuum gas oils, lubricant oil raffinates, lubricant oil feedstocks, brightstocks, slack waxes (crude waxes), foot's oils, deoiled waxes, paraffinic waxes, microcrystalline waxes, petrolatum, synthetic oils, FT synthesis oils, FT synthesis waxes, high-pour-point polyolefins, and straight-chain α-olefin waxes. These hydrocarbon oils can be used alone or in a combination of two or more.

In the method for dewaxing the first hydrocarbon oil of the present invention, it is preferred for the reaction conditions during the conversion from at least a portion of normal paraffins to isoparaffins to be determined in accordance with those in the method for producing the base oil of the present invention to be described later.

The temperature of the hydroisomerization reaction in the first method for dewaxing a hydrocarbon of the present invention, is generally 200 to 450° C., and preferably 220 to 400° C. If the reaction temperature is below 200° C., the isomerization of the normal paraffins contained in the hydrocarbon oil as a feedstock tends not to easily proceed, resulting in insufficient reduction and removal of the waxy components. Conversely, if the reaction temperature is more than 450° C., cracking reaction of the hydrocarbon oil tends to be significant, resulting in a reduced yield of a desired base oil.

The pressure in the hydroisomerization reaction in the dewaxing a first hydrocarbon of the present invention is generally 0.1 to 20 MPa, and preferably 0.5 to 15 MPa. If the reaction pressure is below 0.1 MPa, catalyst deterioration due to the formation of coke tends to be accelerated. Conversely, if the reaction pressure is more than 20 MPa, construction costs for the apparatus tend to increase, making it difficult to realize an economic process.

The liquid hourly space velocity of the hydrocarbon oil relative to the catalyst, of the hydroisomerization reaction in the method for dewaxing a first hydrocarbon of the present invention is generally 0.01 to 100 $hr^{-1}$, and preferably 0.1 to 50 $hr^{-1}$. If the liquid hourly space velocity is less than 0.01 $hr^{-1}$, excessive cracking reaction of the hydrocarbon oil tends to easily proceed, resulting in lowered production efficiency for a desired base oil. Conversely, if the liquid hourly space velocity is more than 100 $hr^{-1}$, the isomerization of the normal paraffins contained in the hydrocarbon oil tends not to easily proceed, resulting in insufficient reduction and removal of the waxy components.

The feed ratio of hydrogen to hydrocarbon oil of the hydroisomerization reaction in the method for dewaxing a first hydrocarbon of the present invention is generally 100 to 1000 $Nm^3/m^3$, and preferably 200 to 800 $Nm^3/m^3$. If the feed ratio is less than 100 $Nm^3/m^3$, for example, when the feedstock contains sulfur and nitrogen compounds, hydrogen sulfide and ammonia gas produced by desulfurization and denitrification reactions that accompany the isomerization reaction tend to adsorb onto and poison the active metal on the catalyst, thus making it difficult to achieve predetermined catalytic performance. Conversely, if the feed ratio is more than 1000 $Nm^3/m^3$, hydrogen feed equipment having increased capacity tends to be required, making it difficult to realize an economical process.

The conversion of normal paraffins in the hydroisomerization reaction in the method for dewaxing a first hydrocarbon of the present invention is adjusted as desired according to the use of the desired base oil.

<Method for Producing a First Lubricant Base Oil>

Next, the method for producing a first lubricant base oil of the present invention is described. The method for producing a first lubricant base oil of the present invention comprises contacting, in the presence of hydrogen, a hydrocarbon oil containing normal paraffins having 10 or more carbon atoms, with the first hydroisomerization catalyst of the present invention, under conditions that give substantially 100 mass % conversion of the normal paraffins, as defined by the following expression (A-I):

[Expression 3]

$$\text{Normal paraffin conversion (\%)} = \left[1 - \left(\frac{\text{Total mass of the normal paraffins having } Cn \text{ or more contained in the hydrocarbon oil after contacting}}{\text{Total mass of the normal paraffins having } Cn \text{ or more contained in the hydrocarbon oil before contacting}}\right)\right] \times 100 \quad \text{(A-I)}$$

wherein Cn represents a minimum number of carbon atoms of the normal paraffins having 10 or more carbon atoms contained in the hydrocarbon oil before contacting.

The phrase "substantially 100 mass % conversion" means that the amount of normal paraffins contained in the hydrocarbon oil after contacting is 0.1 mass % or less.

The hydrocarbon oil that is subjected to the method for producing a first lubricant base oil of the present invention is not particularly limited as long as it contains normal paraffins having 10 or more carbon atoms; however, the hydrocarbon feedstock preferably contains a hydrocarbon oil having an initial boiling point higher than that of a desired lubricant base oil. Examples suitable as such feedstocks include petroleum fractions, synthetic oils and waxes, and the like that are fractions having boiling points of more than 360° C. as calculated at atmospheric pressure; specific examples include heavy gas oils, vacuum gas oils, hydrocracked residual oils of vacuum gas oils, lubricant oil raffinates, brightstocks, slack waxes (crude waxes), foot's oils, deoiled waxes, paraffinic waxes, microcrystalline waxes, petrolatum, synthetic oils, FT synthesis oils, FT synthesis waxes, high-pour-point polyolefins, and straight-chain α-olefin waxes. These hydrocarbon feedstocks can be used alone or in a combination of two or more. Further, these oils have preferably been hydroprocessed or lightly hydrocracked. These treatments can reduce or remove sulfur-containing compounds, nitrogen-containing compounds, and other substances that cause the activity of the hydroisomerization catalyst to decrease, and aromatic hydrocarbons, naphthenic hydrocarbons, and other substances that cause the viscosity index of the lubricant base oil to decrease.

By contacting any of the above-mentioned relatively heavy hydrocarbon oils as a feedstock with the first hydroisomerization catalyst of the present invention in the presence of hydrogen, it is possible to allow the isomerization of the normal paraffins contained in the hydrocarbon oil, i.e., the dewaxing reaction of the hydrocarbon oil, to proceed, while sufficiently suppressing the conversion of the hydrocarbon oil into lighter products. In this way, base oils containing 90 vol % or more of fractions having boiling points of more than 360° C. as calculated at atmospheric pressure can be produced in high yield. Moreover, according to the method for producing a base oil of the present invention, a base oil containing many branched-chain isomers can be produced. In particular, for a high-quality lubricant base oil, it is required that the amount of normal paraffins be 0.1 mass % or less; according to the method for producing a base oil of the present invention, a lubricant base oil that meets this level of requirement can be produced in high yield.

In the hydroisomerization of a hydrocarbon oil containing normal paraffins, it is possible to reduce the amount of normal paraffins contained in the resulting reaction product, by, for example, increasing the reaction temperature to thereby improve the normal paraffin conversion, resulting in improved cold flow property of the hydrocarbon oil. However, increasing the reaction temperature promotes the cracking reactions of the hydrocarbon oil as a feedstock and isomerized products, thereby increasing the amount of light fractions together with improving the normal paraffin conversion. Such an increase in light fractions is responsible for reducing the viscosity index of the hydrocarbon oil; therefore, in order to maintain the performance of a lubricant base oil within a predetermined range, it is necessary to separate and remove these light fractions by, for example, distillation.

Particularly in the production of high-performance lubricant base oils such as Group III+ according to the classification of the grades of lubricant oils prescribed by the American Petroleum Institute by catalytic dewaxing of the hydrocarbon oil, it is necessary to increase the normal paraffin conversion in the hydrocarbon oil as a feedstock up to substantially 100%. With conventional processes for producing lubricant base oils using catalysts for catalytic dewaxing, the yields of the above-mentioned high-performance lubricant base oils are extremely low under conditions that give substantially 100% normal paraffin conversion. As opposed to this, according to the method for producing a first lubricant base oil of the present invention, it is possible to maintain the yields of the above-mentioned high-performance lubricant base oils at high levels, even when the hydroprocessing step is performed under conditions that give substantially 100% normal paraffin conversion.

The equipment for carrying out the method for dewaxing a first hydrocarbon oil, the method for producing a hydrocarbon, and the method for producing a first lubricant base oil of the present invention is not particularly limited, and known equipment can be employed. The reaction equipment may be any of a continuous flow-type, a batch-type, and a semi-batch-type; however, a continuous flow-type is preferred in view of productivity and efficiency. The catalyst bed may be any of a fixed bed, a fluidized bed, and a stirred bed; however, a fixed bed is preferred in view of equipment costs and the like. The reaction phase is preferably a mixed phase of gas and liquid.

In the method for dewaxing a first hydrocarbon oil, the method for producing a hydrocarbon, and the method for producing a first lubricant base oil of the present invention, the hydrocarbon oil as a feedstock to be fed may be hydroprocessed or hydrocracked as a stage prior to the dewaxing step utilizing the hydroisomerization reaction described above. Known equipment, catalysts, and reaction conditions can be used for the hydroprocessing or hydrocracking. By carrying out these pre-treatments, it is possible to maintain the activity of the first hydroisomerization catalyst of the present invention over an extended period of time, and to reduce the amount of substances of concern such as sulfur- and nitrogen-containing compounds in the product.

Further, in the method for producing a first lubricant base oil of the present invention, the reaction product obtained in the dewaxing step can further be treated by, for example, hydrofinishing. Hydrofinishing can be typically carried out by contacting, in the presence of hydrogen, a hydrogenation catalyst supported on a metal (e.g., platinum supported on alumina), with the product to be finished. By performing such hydrofinishing, it is possible to improve the hue, oxidation stability, and the like of the reaction product obtained in the dewaxing step, thereby enhancing the product quality. The hydrofinishing may be carried out in reaction equipment separate from that of the dewaxing step; alternatively, a catalyst layer for hydrofinishing may be provided downstream the catalyst layer of the first hydroisomerization catalyst of the present invention provided in the reactor for performing the dewaxing step, and the hydrofinishing may be performed subsequent to the dewaxing step.

It is noted that, in general, isomerization refers to a reaction whereby only the molecular structure changes without a change in the number of carbon atoms (the molecular weight), and cracking refers to a reaction that involves a decrease in the number of carbon atoms (molecular weight). In the catalytic dewaxing reaction utilizing the isomerization reaction, a certain degree of cracking of the hydrocarbon used as a stock and isomerized products may occur, as long as the number of carbon atoms (the molecular weight) of the product is maintained within a predetermined range that permits the formation of an intended base oil, and the cracked products may also be constituents of the base oil.

<The Second Hydroisomerization Catalyst>

The second hydroisomerization catalyst of the present invention is imparted with the features thereof by being produced by the specific process. Hereinafter the second hydroisomerization catalyst of the present invention is described with reference to preferred embodiments for producing the catalyst.

Described first of all is the organic template-containing zeolite which is the starting ingredient of the calcined zeolite (a2) composing the second hydroisomerization catalyst of the present invention, a crystal aggregate having a number average length of the longitudinal direction of 0.01 to 1 μm and has a 10-membered ring one-dimensional porous structure (hereinafter referred to as "second organic template-containing zeolite").

The second organic template-containing zeolite has a one-dimensional porous structure made of a 10-membered ring, in view of achieving a high level of both high isomerization activity and suppressed cracking activity in the hydroisomerization reactions of normal paraffins. Examples of such zeolites include AEL, EUO, FER, HEU, MEL, MFI, NES, TON, MTT, WEI, and ZSM-48. It is noted that the above three alphabet letters designate framework-type codes assigned to various structures of classified molecular sieve-type zeolites by the Structure Commission of the International Zeolite Association. It is also noted that zeolites having the same topology are collectively designated by the same code.

Among the above-mentioned zeolites, preferred are zeolites having the TON and MTT structures, and zeolite ZSM-48, in view of high isomerization activity and low cracking activity. Zeolite ZSM-22 is more preferred among zeolites having the TON structure, and zeolite ZSM-23 is more preferred among zeolites having the MTT structure.

The second organic template-containing zeolite is hydrothermally synthesized according to a known method using a silica source, an alumina source, and an organic template that is added to construct the predetermined porous structure described above.

The organic template is an organic compound having an amino group, ammonium group, or the like that is added to construct the predetermined porous structure to a zeolite, and is selected according to the structure of the zeolite to be synthesized; however, the organic template is preferably an amine derivative. Specifically, the organic template is preferably at least one selected from the group consisting of alkylamines, alkyldiamines, alkyltriamines, alkyltetramines, pyrrolidine, piperazine, aminopiperazine, alkylpentamines, alkylhexamines, and their derivatives.

The molar ratio of the silicon element to aluminum element ([Si]/[Al]; hereinafter referred to as the "Si/Al ratio") that constitute the second organic template-containing zeolite is preferably 10 to 400, and more preferably 20 to 350. If the Si/Al ratio is less than 10, although the activity for the conversion of normal paraffins increases, the isomerization selectivity to isoparaffins tends to decrease, and cracking reactions tend to sharply increase as the reaction temperature increases, which is undesirable. Conversely, if the Si/Al ratio is more than 400, catalytic activity needed for the conversion of normal paraffins cannot be easily obtained, which is undesirable.

In the present embodiment, when synthesized, it is important that the number average length of the longitudinal direction of the crystal aggregate is adjusted to 0.01 to 1 μm by controlling the size of the crystal aggregate. The phrase "crystal aggregate" as referred to herein means an aggregate in which a plurality of zeolite crystallites are held together. Further, these crystals are needle crystals, and the phrase "number average length of the longitudinal direction" means an average length of the longitudinal direction of the needle crystal. The number average length of the longitudinal direction of the crystal aggregate is determined by measuring each length of the long axis of randomly selected 100 crystal aggregates from the image taken at a magnification of 50000 times of a spontaneous scope observed using a scanning electron microscope (hereinafter sometimes referred to as "SEM"), whereby the arithmetic mean value of these measured lengths is taken.

In the case where a number average length of the longitudinal direction of the crystal aggregate is smaller than 0.01 μm, the mechanical strength of the crystal is low and the crystal breaks by a mechanical or thermal treatment likely causing the isomerization reaction activity to reduce, whereas in the case where a number average length exceeds 1 μm, the hydroisomerization activity of the hydroisomerization catalyst may not sufficiently enhance, hence not preferable.

As a method for controlling the size of the crystal aggregate within the above range, methods by which the crystal growth is suppressed are typically employed. Among these, in a reactor in which the synthesis of the zeolite is carried out, it is preferred to mix the reaction mixture at a high speed. In the case where the reactor is equipped with a stirrer, it is preferred to increase the number of rotations of the stirrer, in the case where the reactor is the equipment in which the reaction mixture is mixed by rotating or vibrating the reactor itself, it is preferred to increase the number of rotation or the number of vibration thereof. Since the methods for stirring and mixing the reaction mixture and the efficiency thereof vary depending on the equipment for the zeolite synthesis, it is difficult to specifically define the number of rotations or the number of vibrations of a stirrer or a reactor itself. As an example, in the case where tumbling is typically carried out at a rotational frequency of 30 rpm in the equipment in which the mixing of contents is carried out by tumbling a reactor itself, the size of the crystal aggregate can be adjusted to a predetermined size by changing the rotational frequency to 60 rpm.

It is preferred that the second organic template-containing zeolite satisfy the following formula (B-I).

$$0.8 \leq [Si/Al]_{XPS}/[Si/Al]_{XRF} \leq 1.0 \quad (B\text{-}I)$$

wherein $[Si/Al]_{XPS}$ represents a molar ratio of silicon atoms to aluminum atoms in the organic template-containing zeolite measured using an X-ray photoelectron spectroscopy analysis, and $[Si/Al]_{XRF}$ represents a molar ratio of silicon atoms to aluminum atoms in the organic template-containing zeolite measured using an X-ray fluorescence analysis.

X-ray photoelectron spectroscopy analysis (hereinafter sometimes referred to as "XPS") is a technique for analyzing the atoms present only at a portion very near to the solid surface, whereas X-ray fluorescence analysis (hereinafter sometimes referred to as "XRF") is a technique for analyzing the atoms present at the solid surface to those at a portion deep therefrom when compared with XPS. Generally, the silicon atom and the aluminum atom composing a zeolite are often found to have a different constituent ratio between the surface and the interior of the zeolite crystal. More specifically, in proximity to the crystal surface, the constituent molar ratio of the silicon atom and the aluminum atom (Si/Al) is small compared to the crystal interior, in other words, in proximity to the crystal surface, it is common that the ratio of the aluminum atom is relatively higher compared with the interior. In this case, the value of $[Si/Al]_{XPS}/[Si/Al]_{XRF}$ becomes small. To the contrary, in the case where the ratio of the aluminum atom at the crystal surface is closer to that of the crystal interior, the value of $[Si/Al]_{XPS}/[Si/Al]_{XRF}$ becomes closer to 1. As a result, it shows that the closer the value of $[Si/Al]_{XPS}/[Si/Al]_{XRF}$ is to 1, the more uniform the composition of the crystal surface and the crystal interior is.

In the case where the $[Si/Al]_{XPS}/[Si/Al]_{XRF}$ value of the above organic template-containing zeolite is below 0.8, it is not preferable because the isomerization activity of normal paraffins have a small improvement effect. Further, it is difficult to synthesize a zeolite having the above value exceeding 1.0.

As a method for controlling $[Si/Al]_{XPS}/[Si/Al]_{XRF}$ of the second organic template-containing zeolite within the above range, examples include changing the amount ratio of a silica source to an alumina source at the time of the zeolite synthesis and changing the mixing speed of the reaction mixture. As a specific example, when an amount of an alumina source is increased to an amount of a silica source or a mixing speed of the reaction mixture is increased, the $[Si/Al]_{XPS}/[Si/Al]_{XRF}$ value tends to increase.

The synthesized organic template-containing zeolite, which has preferably been washed and dried, typically has alkali metal cations as counter cations, and incorporates the organic template in its porous structure. The zeolite containing an organic template, which is used for producing the hydroisomerization catalyst of the present invention, is preferably in such a synthesized state, i.e., preferably, the zeolite has not been subjected to calcination treatment for removing the organic template incorporated therein.

The organic template-containing zeolite is subsequently ion-exchanged in a solution containing ammonium ions and/or protons. By the ion-exchange treatment, the counter cations contained in the organic template-containing zeolite are exchanged into ammonium ions and/or protons. At the same time, a portion of the organic template incorporated in the organic template-containing zeolite is removed.

The solution used for the ion-exchange treatment is preferably a solution that uses a solvent containing at least 50 vol % of water, and more preferably an aqueous solution. Examples of compounds for supplying ammonium ions into the solution include various inorganic and organic ammonium salts, such as ammonium chloride, ammonium sulfate, ammonium nitrate, ammonium phosphate, and ammonium acetate. On the other hand, mineral acids such as hydrochloric acid, sulfuric acid, and nitric acid are typically used as compounds for supplying protons into the solution. The ion-exchanged zeolite (herein, an ammonium-form zeolite) obtained by ion exchange of the organic template-containing zeolite in the presence of ammonium ions releases ammonia during subsequent calcination, and the counter cations are converted into protons to form Bronsted acid sites. Ammonium ions are preferred as the cationic species used for the ion exchange. The amount of ammonium ions and/or protons contained in the solution is preferably adjusted to 10 to 1000 equivalents relative to the total amount of the counter cations and organic template contained in the organic template-containing zeolite used.

The ion-exchange treatment may be applied to the organic template-containing zeolite alone in powder form; alternatively, prior to the ion-exchange treatment, the organic template-containing zeolite may be mixed with an inorganic porous oxide, which is a binder, and extruded, and the ion-exchange treatment may be applied to the resulting extruded product. However, if the extruded product in its uncalcined state is subjected to the ion-exchanged treatment, the problem of collapsing and powdering of the extruded product will easily arise; therefore, it is preferred to subject the organic template-containing zeolite in powder form to the ion-exchange treatment.

The ion-exchange treatment is preferably performed according to a standard method, i.e., a method in which the organic template-containing zeolite is immersed in a solution, preferably an aqueous solution, containing ammonium ions and/or protons, and the solution is stirred and fluidized. The stirring or fluidization is preferably performed under heating to improve the ion-exchange efficiency. In the present invention, it is particularly preferred to use a method in which the aqueous solution is heated, boiled, and ion-exchanged under reflux.

Further, in view of improving the ion-exchange efficiency, during the ion exchange of the zeolite in a solution, the solution is preferably exchanged with a fresh one once or twice or more, and more preferably exchanged with a fresh one once or twice. When the solution is exchanged once, the ion-exchange efficiency can be improved by, for example, immersing the organic template-containing zeolite in a solution containing ammonium ions and/or protons, and heating the solution under reflux for 1 to 6 hours, followed by exchanging the solution with a fresh one, and further heating under reflux for 6 to 12 hours.

By the ion-exchange treatment, substantially all of the counter cations such as an alkali metal in the zeolite can be exchanged into ammonium ions and/or protons. On the other hand, with respect to the organic template incorporated in the zeolite, although a portion of the organic template is removed by the ion-exchange treatment, it is generally difficult to remove all of the organic template even if the ion-exchange treatment is repeatedly performed, resulting in a portion of the organic template remaining inside the zeolite.

Next, it is preferred to mix the ion-exchanged zeolite obtained by the above-described method with an inorganic porous oxide, which is a binder, and extrude the resulting composition to form a extruded product. The purpose of mixing the ion-exchanged zeolite with an inorganic porous oxide is to increase the mechanical strength of the support (in particular, a particulate support) obtained by calcining the extruded product to a degree that can withstand practical applications; however, the present inventors have found that the selection of the type of inorganic oxide affects the isomerization selectivity of the hydroisomerization catalyst. From this viewpoint, at least one inorganic porous oxide selected from alumina, silica, titania, boria, zirconia, magnesia, ceria, zinc oxide, phosphorus oxide, and a composite oxide containing a combination of at least two or more of these oxides can be used as the inorganic porous oxide. Among the above, alumina is preferred in view of further improving the isomerization selectivity of the hydroisomerization catalyst. The phrase "composite oxide containing a combination of at least two or more of these oxides" is a composite oxide containing at least two components from alumina, silica, titania, boria, zirconia, magnesia, ceria, zinc oxide, and phosphorus oxide, but is preferably an alumina-based composite oxide containing 50 mass % or more of an alumina component based on the composite oxide.

The proportion of the ion-exchanged zeolite to the inorganic porous oxide in the above-mentioned composition is preferably 10:90 to 90:10, and more preferably 30:70 to 85:15, in terms of the mass ratio of the ion-exchanged zeolite to the inorganic porous oxide. If this ratio is less than 10:90, the activity of the hydroisomerization catalyst tends to be insufficient, which is undesirable. Conversely, if the ratio is more than 90:10, the mechanical strength of the support obtained by extruding and calcining the composition tends to be insufficient, which is undesirable.

Although the method for mixing the ion-exchanged zeolite with the inorganic porous oxide is not particularly limited, a general method can be employed, such as, for example, a method in which a suitable amount of a liquid such as water is added to the powders of both components to form a viscous fluid, and the fluid is kneaded in a kneader or the like.

The composition containing the ion-exchanged zeolite and inorganic porous oxide, or a viscous fluid containing the composition, is extruded by extrusion or other methods, and is preferably dried, to form a particulate extruded product. Although the shape of the extruded product is not particularly limited, the extruded product may, for example, have a cylindrical shape, pellet shape, spherical shape, or irregular tubular shape having a three leaf-shaped or four leaf-shaped cross section. Although the size of the extruded product is not particularly limited, the extruded product is preferably, for example, about 1 to 30 mm in long axis, and about 1 to 20 mm in short axis, in view of the ease of handling, the load density in the reactor, etc.

Next, it is preferred to calcine the thus obtained extruded product extruded as above at a temperature of 350 to 450° C., preferably 380 to 430° C., more preferable 390 to 420° C., in an atmosphere containing molecular oxygen, to give a calcined support having a thermal treatment that includes thermally treating at 350° C. or more. The phrase "in an atmosphere containing molecular oxygen" means contacting the extruded product with gases containing oxygen gas, and, particularly preferably with air. The calcination time is not particularly limited, but it is preferred to be 1 to 24 hours, and it is more preferred to be 1 to 10 hours. In this embodiment, if the calcination temperature is lower than 350° C., the removal of the organic template tends not to proceed sufficiently, or the removal tends to require a long time, and further, the mechanical strength of the support particles tends not to be improved sufficiently, which is undesirable. Conversely, if the calcination temperature is higher than 450° C., the isomerization selectivity of the resulting hydroisomerization catalyst tends not to be improved sufficiently, which is undesirable. It is extremely preferred to calcine the ion-exchanged zeolite that has not been thermally treated at 350° C. or more and containing residual organic template at a comparatively low temperature as defined above, in order to improve the isomerization selectivity of the second hydroisomerization catalyst of the present invention.

By the above calcination, the ion-exchanged zeolite composing the extruded product becomes the calcined zeolite (a2), and the inorganic porous oxide becomes the calcined inorganic porous oxide (b2).

The calcination may be carried out using the ion-exchanged zeolite alone in powder form as an alternative to calcining the extruded product obtained by extruding the composition prepared by mixing the ion-exchanged zeolite with the inorganic oxide as described above. In this case, however, it is preferred to calcine the extruded product obtained by extruding a composition prepared by mixing the resulting calcined zeolite with an inorganic oxide at a temperature of 350° C. or more, for example, at a temperature within the range from 350 to 450° C. and/or within the range of more than 450° C. and 650° C. or less, for the purpose of imparting mechanical strength to the extruded product.

The above support may be calcined by thermally treating within the range from 350 to 450° C., and by further thermally treating within the range of more than 450° C. and 650° C. or less, preferably in an atmosphere containing molecular oxygen, and more preferably in an air atmosphere. The calcination by further thermally treating at more than 450° C. and 650° C. or less, in addition to thermally treating at 350 to 450° C., allows the mechanical strength of the support to be further improved, without significantly affecting the hydroisomerization selectivity of the resulting catalyst. Therefore, when catalyst particles having a higher mechanical strength are desired, it is preferred to perform calcination by the two-stage thermally treating described above. If the thermally treating temperature in the latter stage is 450° C. or less, it tends to be difficult to further improve the mechanical strength of the support. Conversely, if the thermally treating temperature is more than 650° C., the environment of the aluminum atoms that involve the formation of active sites on the zeolite tends to change, resulting in increased cracking activity, which is undesirable.

In this embodiment, it is preferred for the support thus obtained as above to support at least one metal of metals belonging to Groups 8 to 10 of the periodic table, molybdenum and tungsten (hereinafter sometimes referred to as "active metal").

Examples of metals belonging to Groups 8 to 10 of the periodic table include iron, ruthenium, osmium, cobalt, rhodium, iridium, nickel, palladium, and platinum. Among these metals, platinum and/or palladium is preferred, and platinum is particularly preferred, in view of the activity, isomerization selectivity, and durability of activity. The above-mentioned active metals can be used alone or in a combination of two or more. Moreover, when the hydroisomerization catalyst of the present invention is used for hydroisomerization of a hydrocarbon oil containing many sulfur-containing compounds and/or nitrogen-containing compounds, it is preferred for the active metals to be a combination such as nickel-cobalt, nickel-molybdenum, cobalt-molybdenum, nickel-molybdenum-cobalt, or nickel-tungsten-cobalt, in view of the durability of catalytic activity.

The method for supporting the above-mentioned active metal on the support is not particularly limited; known methods are employed, such as impregnation methods (equilibrium adsorption, pore filling, and incipient wetting) using compounds containing the above-mentioned active metal elements (hereinafter sometimes referred to as "active metal precursors"), or ion-exchange methods.

Examples of active metal precursors include hydrochlorides, sulfates, nitrates, and complex compounds of the above-mentioned active metals. When the active metal is platinum, active metal precursors that are preferably used include chloroplatinic acid, tetraamminedinitroplatinum, dinitroaminoplatinum, and tetraamminedichloroplatinum.

The total amount of the active metal supported on the support containing the calcined zeolite (a2) and the calcined inorganic porous oxide (b2) is preferably 0.001 to 20 mass %, based on the mass of the support. If the amount supported is less than 0.001 mass %, it will be difficult to impart a predetermined hydrogenation/dehydrogenation function to the catalyst. Conversely, if the amount supported is more than 20 mass %, conversion of hydrocarbons into lighter products on the active metal by cracking tends to easily proceed, causing the yield of a desired fraction to decrease, and further causing the catalyst costs to increase, which is undesirable.

The active metal may be supported on either one or both of the calcined zeolite (a2) and the calcined inorganic porous oxide (b2) composing the support. When the hydroisomerization catalyst of the present invention is produced by a method in which an active metal is supported on the support by, for example, an impregnation method, the distribution of sites on which the active metal is supported is mainly determined by the affinity between the active metal precursor used in the supporting, and the calcined zeolite (a2) and calcined inorganic porous oxide (b2).

The supporting of an active metal is not limited to an embodiment which applies to the extruded and the calcined support. For example, an active metal may be supported on the ion-exchanged zeolite in powder form, or on the calcined zeolite obtained by calcining the ion-exchanged zeolite at a temperature of preferably 350 to 450° C., or may be supported on the inorganic porous oxide in power form; alternatively, may be supported on both of the zeolite and the inorganic oxide.

It is preferred that the support on which the active metal component is supported be calcined preferably in an atmosphere containing molecular oxygen, mainly for the purpose of removing the anionic component or ligand component contained in the active metal precursor. It is preferred that the calcination temperature be 250° C. to 600° C., and it is more preferred to be 300 to 500° C. The atmosphere containing molecular oxygen is preferably air. The calcination time is typically about 0.5 to about 20 hours. By calcination treatment as described above, the active metal precursor is converted into a metal alone, an oxide thereof, or a similar species thereto.

As described above, the preferred embodiment for producing the second hydroisomerization catalyst of the present invention comprises the steps of "ion-exchanging of the above specific organic template-containing zeolite", "extruding the composition containing the ion-exchanged zeolite and an inorganic porous oxide", "calcining the extruded product by thermally treating at 350 to 450° C." or "calcining the extruded product by thermally treating at 350 to 450° C., and subsequently thermally treating at more than 450° C. and 650° C. or less", "supporting an active metal on a support", and "calcining the support on which an active metal is supported".

In producing the second hydroisomerization catalyst of the present invention, the embodiments and procedural steps thereof for carrying out each steps described above may be different from the above described preferred embodiments of the production and can be suitably varied as necessary within a range which does not pose problems in each step of producing the catalyst or invite an increase of the production cost due to more complicated steps.

It is preferred that, subsequent to the above calcination treatment, the second hydroisomerization catalyst of the present invention be subjected to reduction treatment, preferably after the catalyst is loaded in the reactor for conducting the hydroisomerization reaction. Specifically, it is preferred that the catalyst be subjected to the reduction treatment performed for about 0.5 to about 5 hours in an atmosphere containing molecular hydrogen, preferably under a stream of hydrogen gas, preferably at 250 to 500° C., and more preferably at 300 to 400° C. This step further ensures that high activity for dewaxing a hydrocarbon oil can be imparted to the catalyst.

In the second hydroisomerization catalyst of the present invention, a metal other than the metals belonging to Groups 8 to 10 of the periodic table, molybdenum, and tungsten may further be supported on the calcined zeolite and/or calcined inorganic porous oxide, within a range such that the effects of the present invention are not impaired.

<Method for Producing the Second Hydroisomerization Catalyst>

Example of the method for producing the second hydroisomerization catalyst of the present invention include the process described as the procedural steps for obtaining the above-described preferred embodiments of the second hydroisomerization catalyst of the present invention.

<Method for Dewaxing the Second Hydrocarbon Oil>

Next, the method for dewaxing the second hydrocarbon oil of the present invention is described. The method for dewaxing the second hydrocarbon oil of the present invention comprises the step of contacting, in the presence of hydrogen, a hydrocarbon oil containing normal paraffins having 10 or more carbon atoms, with the above-described second hydroisomerization catalyst of the present invention, thereby converting a portion or all of the normal paraffins to isoparaffins.

The hydrocarbon oil that is subjected to the method for dewaxing the second hydrocarbon oil of the present invention is not particularly limited as long as it contains normal paraffins having 10 or more carbon atoms; preferably, the hydrocarbon oil contains normal paraffins having 15 or more carbon atoms. Specific examples include various hydrocarbon oils ranging from relatively light distillate fractions such as kerosenes and jet fuels, to high boiling feedstocks such as whole crude petroleum, reduced crudes, vacuum tower residual oils, vacuum residual oils, hydrocracked vacuum residual oils, cycle oils, synthetic crudes (e.g., shale oils, tar oils, etc.), gas oils, vacuum gas oils, foot's oils, fuel fractions or waxy components derived from FT synthesis oils, and other heavy oils. These hydrocarbon oils may also contain, in addition to normal paraffins, waxy components composed of naphthenic hydrocarbons having long straight-chain alkyl groups on side chains, or aromatic hydrocarbons.

Particularly preferred as hydrocarbon oils to be dewaxed by the method for dewaxing the second hydrocarbon oil of the present invention are hydrocarbon oils composed of hydrocarbons having boiling points of about 180° C. or more, and having 10 or more carbon atoms. Hydrocarbon oils lighter than these hydrocarbon oils typically contain substantially no waxy components that affect the cold flow property; therefore, the need to dewax these hydrocarbon oils is low, and hence, the effects of the present invention are unlikely achieved.

Conversely, it is particularly effective to apply the dewaxing method of the present invention to distillate feedstocks containing waxy components such as middle distillate feedstocks including gas oils, kerosenes, and jet fuels, lubricant oil feedstocks, heating oils, and other distillate fractions whose pour point and viscosity need to be maintained within a predetermined range. Examples of such hydrocarbon oils include hydroprocessed or hydrocracked gas oils, heavy gas oils, vacuum gas oils, hydrocracked vacuum residual oils, lubricant oil raffinates, lubricant oil feedstocks, brightstocks, slack waxes (crude waxes), foot's oils, deoiled waxes, paraffinic waxes, microcrystalline waxes, petrolatum, synthetic oils, FT synthetic oils, FT synthesis waxes, high-pour-point polyolefins, and straight-chain a olefin waxes. These hydrocarbon oils can be used alone or in a combination of two or more.

In the method for dewaxing the second hydrocarbon oil of the present invention, it is preferred for the reaction conditions during the conversion from at least a portion of normal paraffins to isoparaffins to be determined in accordance with those in the method for producing the base oil of the present invention to be described later.

The temperature of the hydroisomerization reaction in the method for dewaxing the second hydrocarbon of the present invention is generally 200 to 450° C., and preferably 220 to 400° C. If the reaction temperature is below 200° C., the isomerization of the normal paraffins contained in the hydrocarbon oil as a feedstock tends not to easily proceed, resulting in insufficient reduction and removal of the waxy components. Conversely, if the reaction temperature is more than 450° C., cracking reaction of the hydrocarbon oil tends to be significant, resulting in a reduced yield of a desired base oil.

The pressure in the hydroisomerization reaction in the dewaxing the second hydrocarbon of the present invention is generally 0.1 to 20 MPa, and preferably 0.5 to 15 MPa. If the reaction pressure is below 0.1 MPa, catalyst deterioration due to the formation of coke tends to be accelerated. Conversely, if the reaction pressure is more than 20 MPa, construction costs for the apparatus tend to increase, making it difficult to realize an economic process.

The liquid hourly space velocity of the hydrocarbon oil relative to the catalyst in hydroisomerization reaction in the method for dewaxing the second hydrocarbon of the present invention is typically 0.01 to 100 $hr^{-1}$, and preferably 0.1 to 50 $hr^{-1}$. If the liquid hourly space velocity is less than 0.01 $hr^{-1}$, excessive cracking reaction of the hydrocarbon oil tends to easily proceed, resulting in lowered production efficiency for a desired base oil. Conversely, if the liquid hourly space velocity is more than 100 $hr^{-1}$, the isomerization of the normal paraffins contained in the hydrocarbon oil tends not to easily proceed, resulting in insufficient reduction and removal of the waxy components.

The feed ratio of hydrogen to hydrocarbon oil of the hydroisomerization reaction in the method for dewaxing the second hydrocarbon of the present invention is typically 100 to 1000 $Nm^3/m^3$, and preferably 200 to 800 $Nm^3/m^3$. If the feed ratio is less than 100 $Nm^3/m^3$, for example, when the feedstock contains sulfur and nitrogen compounds, the hydrogen sulfide and ammonia gas produced by desulfurization and denitrification reactions that accompany the isomerization reaction tend to adsorb onto and poison the active metal on the catalyst, thus making it difficult to achieve predetermined catalytic performance. Conversely, if the feed ratio is more than 1000 Nm³/m³, hydrogen feed equipment having increased capacity tends to be required, making it difficult to realize an economical process.

The conversion of normal paraffins in the hydroisomerization reaction in the method for dewaxing the second hydrocarbon of the present invention is adjusted as desired according to the intended use of base oil.

<Method for Producing the Second Lubricant Base Oil>

Next, the method for producing the second lubricant base oil of the present invention is described. The method for producing the second lubricant base oil of the present invention comprises contacting, in the presence of hydrogen, a hydrocarbon oil containing normal paraffins having 10 or more carbon atoms, with the second hydroisomerization catalyst of the above present invention under conditions that give substantially 100 mass % conversion of the above normal paraffins, as defined by the following expression (B-II):

[Expression 4]

$$\text{Normal paraffin conversion (\%)} = \left[1 - \frac{\left(\begin{array}{c}\text{Total mass of the}\\\text{normal paraffins having}\\\text{Cn or more}\\\text{contained in the}\\\text{hydrocarbon oil}\\\text{after contacting}\end{array}\right)}{\left(\begin{array}{c}\text{Total mass of the}\\\text{normal paraffins having}\\\text{Cn or more}\\\text{contained in the}\\\text{hydrocarbon oil}\\\text{before contacting}\end{array}\right)}\right] \times 100 \quad \text{(B-II)}$$

wherein Cn represents a minimum number of carbon atoms of the normal paraffins having 10 or more carbon atoms contained in the hydrocarbon oil before contacting. Here, the phrase "substantially 100 mass % conversion" means that the amount of normal paraffins contained in the hydrocarbon oil after contacting is 0.1 mass % or less.

The hydrocarbon oil that is subjected to the method for producing the second lubricant base oil of the present invention is not particularly limited as long as it contains normal paraffins having 10 or more carbon atoms; however, it is preferred to include the hydrocarbon oil having an initial boiling point higher than that of a desired lubricant base oil. Examples suitable as such feedstocks include petroleum fractions, and synthetic oils and waxes that are fractions having boiling points of more than 360° C. as calculated at atmospheric pressure; specific examples include heavy gas oils, vacuum gas oils, hydrocracked vacuum residual oils, lubricant oil raffinates, brightstocks, slack waxes (crude waxes), foot's oils, deoiled waxes, paraffinic waxes, microcrystalline waxes, petrolatum, synthetic waxes, Fischer-Tropsch synthesis waxes, high-pour-point polyolefins, and straight-chain α olefin waxes. These hydrocarbon feedstocks can be used alone or in a combination of two or more. Further, these oils have preferably been hydroprocessed or lightly hydrocracked. These treatments can reduce or remove sulfur-containing compounds, nitrogen-containing compounds, and other substances that cause the activity of the hydroisomerization catalyst to decrease, and aromatic hydrocarbons, naphthenic hydrocarbons, and other substances that cause the viscosity index of the lubricant base oil to decrease.

By contacting any of the above-mentioned relatively heavy hydrocarbon oils as a feedstock with the second hydroisomerization catalyst of the present invention in the presence of hydrogen, it is possible to allow the isomerization of the normal paraffins contained in the hydrocarbon oil, i.e., the dewaxing reaction of the hydrocarbon oil, to proceed, while sufficiently suppressing the conversion of the hydrocarbon oil into lighter products. In this way, base oils containing 90 vol % or more of fractions having boiling points of more than 360° C. as calculated at atmospheric pressure can be produced in high yield. Moreover, according to the method for producing a base oil of the present invention, a base oil containing many branched-chain isomers can be produced. In particular, for a high-quality lubricant base oil, it is required that the amount of normal paraffins contained be 0.1 mass % or less; according to the method for producing a base oil of the present invention, a lubricant base oil that meets this level of requirement can be produced in high yield.

In the hydroisomerization of a hydrocarbon oil containing normal paraffins, it is possible to reduce the amount of normal paraffins contained in the resulting reaction product, by, for example, increasing the reaction temperature to thereby improve the normal paraffin conversion, resulting in improved cold flow property of the hydrocarbon oil. However, increasing the reaction temperature promotes the cracking reactions of the hydrocarbon oil as a feedstock and isomerized products, thereby increasing the amount of light fractions together with improving the normal paraffin conversion. Such an increase in light fractions is responsible for reducing the viscosity index of the hydrocarbon oil; therefore, in order to maintain the performance of a lubricant base oil within a predetermined range, it is necessary to separate and remove these light fractions by, for example, distillation. Particularly in the production of high-performance lubricant base oils such as Group III+ according to the classification of the grades of lubricant oils prescribed by the American Petroleum Institute by catalytic dewaxing of the hydrocarbon oil, it is necessary to increase the normal paraffin conversion in the hydrocarbon oil as a feedstock up to substantially 100%. With conventional processes for producing lubricant base oils using catalysts for catalytic dewaxing, the yields of the above-mentioned high-performance lubricant base oils are extremely low under conditions that give substantially 100% normal paraffin conversion. As opposed to this, according to the method for producing a lubricant base oil of the present invention, it is possible to maintain the yields of the above-mentioned high-performance lubricant base oils at high levels, even when the hydroprocessing step is performed under conditions that give substantially 100% normal paraffin conversion.

The equipment for carrying out the method for dewaxing a second hydrocarbon oil, and the method for producing a second hydrocarbon, and the method for producing a lubricant base oil of the present invention is not particularly limited, and known equipment can be employed. The reaction equipment may be any of a continuous flow-type, a batch-type, and a semi-batch-type; however, a continuous flow-type is preferred in view of productivity and efficiency. The catalyst bed may be any of a fixed bed, a fluidized bed, and a stirred bed; however, a fixed bed is preferred in view of equipment costs and the like. The reaction phase is preferably a mixed phase of gas and liquid.

In the method for dewaxing a second hydrocarbon oil, and the method for producing a second hydrocarbon, and the method for producing a lubricant base oil of the present invention, the hydrocarbon oil as a feedstock to be fed may be hydroprocessed or hydrocracked as a stage prior to the dewaxing step utilizing the hydroisomerization reaction described above. Known equipment, catalysts, and reaction conditions can be used for the hydroprocessing or hydrocracking. By carrying out these pre-treatments, it is possible to maintain the activity of the second hydroisomerization catalyst of the present invention over an extended period of time, and to reduce the amount of substances of concern such as sulfur- and nitrogen-containing compounds in the product.

Further, in the method for producing a second lubricant base oil of the present invention, the reaction product obtained by the dewaxing step can further be treated by, for example, hydrofinishing. Hydrofinishing can be typically carried out by contacting, in the presence of hydrogen, a hydrogenation catalyst supported on a metal (e.g., platinum supported on alumina), with the product to be finished. By performing such hydrofinishing, it is possible to improve the hue, oxidation stability, and the like of the reaction product obtained in the dewaxing step, thereby enhancing the product quality. The hydrofinishing may be carried out in reaction equipment separate from that of the dewaxing step; alternatively, a catalyst layer for hydrofinishing may be provided downstream the catalyst layer of the hydroisomerization catalyst of the present invention provided in the reactor for performing the dewaxing step, and the hydrofinishing may be performed subsequent to the dewaxing step.

It is noted that, in general, isomerization refers to a reaction whereby only the molecular structure changes without a change in the number of carbon atoms (the molecular weight), and cracking refers to a reaction that involves a decrease in the number of carbon atoms (molecular weight). In the catalytic dewaxing reaction utilizing the isomerization reaction, a certain degree of cracking of the hydrocarbon used as a stock and isomerized products may occur, as long as the number of carbon atoms (the molecular weight) of the product is maintained within a predetermined range that permits the formation of an intended base oil, and the cracked products may also be constituents of the base oil.

EXAMPLES

The present invention will be described in more detail below by examples; however, the invention is not limited to these examples.

Example A-1

Hydroisomerization Catalysts Preparation

<Zeolite ZSM-22 Synthesis>

A zeolite ZSM-22 made of a crystalline aluminosilicate having a Si/Al ratio of 30 was prepared by hydrothermal synthesis, according to the process described in Chem. Eur. J, 2007, vol. 13, page 10070, "Experimental Section", using the following procedure.

First, the following four types of aqueous solutions were prepared.
Solution A: A solution prepared by dissolving 1.94 g of potassium hydroxide in 6.75 mL of ion-exchange water.
Solution B: A solution prepared by dissolving 1.33 g of aluminum sulfate 18-hydrate in 5 mL of ion-exchange water.
Solution C: A solution prepared by diluting 4.18 g of 1,6-hexanediamine (an organic template) with 32.5 ml of ion-exchange water.
Solution D: A solution prepared by diluting 18 g of colloidal silica (Ludox AS-40 by Grace Davison) with 31 ml of ion-exchange water.

Next, Solution A was added to Solution B, and the mixture was stirred until the aluminum component completely dissolved. After Solution C was added to this mixed solution, the mixture of Solutions A, B, and C was introduced into Solution D with vigorous stirring at room temperature. To the resulting mixture was further added, as a "seed crystal" that promotes crystallization, 0.25 g of a powder of ZSM-22 that had been separately synthesized, and had not been subjected to any special treatment after the synthesis, thereby giving a gel.

The gel obtained by the above procedure was transferred into a 120 ml internal volume stainless steel autoclave reactor, and the autoclave reactor was rotated at a rotational speed of 30 rpm on a tumbling apparatus for 60 hours in an oven at 150° C., causing a hydrothermal synthesis reaction to take place. After the completion of the hydrothermal synthesis reaction, the reactor was cooled, the solids produced were taken from each reactor by filtration, washed with ion-exchanged water, and dried overnight in a drier at 60° C., thereby obtaining a zeolite ZSM-22 having a Si/Al ratio of 30 and containing an organic template (hereinafter sometimes referred to as "ZSM-22").

<Ion-Exchanged ZSM-22 Preparation>

The organic template-containing ZSM-22 obtained above was taken in a flask, and 100 ml of 0.5 N-ammonium chloride aqueous solution per gram of the zeolite ZSM-22 was added thereto, and the mixture was heated under reflux for 6 hours. After cooling the heated mixture to room temperature, the supernatant was removed, and the solid was washed with ion-exchange water. To the resulting product, the same amount of 0.5N-ammonium chloride aqueous solution as above was added again, and the mixture was heated under reflux for 12 hours.

Subsequently, the solids were recovered by filtration, washed with ion-exchanged water, and dried overnight in a drier at 60° C., thereby giving ion-exchanged, $NH_4$-form ZSM-22.

<Mixing of a Binder, Extrusion, and Calcination>

The $NH_4$-form ZSM-22 obtained above was mixed with alumina, i.e., a binder, in a mass ratio of 7:3, a small amount of ion-exchange water was added thereto, and the mixture was kneaded. The resulting viscous fluid was loaded in an extruder and extruded into a cylindrical shape product having a diameter of about 1.5 mm and a length of about 5 mm. This extruded product was dried for 3 hours under an air stream in a drier at 120° C., and further calcined under an air stream for 3 hours at 400° C., thereby giving extruded and calcined support particles.

<Platinum Impregnation, and Calcination>

Tetraamminedichloroplatinum (II) ($Pt(NH_3)_4Cl_2$) was dissolved in an amount of ion-exchange water equivalent to the amount of water absorption of the support particles that had been extruded and calcined (previously measured amount), thus giving an impregnation solution. This solution was impregnated in the above-described support particles that have been extruded and calcined by incipient wetting, and supported on the support particles such that the amount of platinum was 0.5 mass % based on the mass of the zeolite ZSM-22. Next, the resulting impregnation product was dried overnight in a drier at 60° C., and then calcined under an air stream for 3 hours at 400° C., thereby giving Hydroisomerization Catalyst A. The crush strength of the catalyst particles obtained was 12.4 N/mm. The crush strength of the catalyst particles was measured in accordance with JIS 82206 "Testing methods for cold compressive strength of refractory bricks".

(Dewaxing Experiment)

A stainless-steel reactor having an inner diameter of 15 mm and a length of 380 mm was loaded with 100 ml of each hydroisomerization catalyst A obtained in the above, and reduction treatment was performed for 12 hours under a hydrogen stream (the hydrogen partial pressure: 3 MPa) at a catalyst bed average temperature of 350° C. Subsequently, a petroleum-derived wax as a feedstock (the distribution of the numbers of carbon atoms: C20 to C43; the composition is shown in FIG. 1.) was introduced into the reactor at a reaction temperature of 200° C., a hydrogen partial pressure of 3 MPa, a LHSV of 2.0 h$^{-1}$, and a hydrogen/oil ratio of 500 NL/L, and the hydroisomerization reaction was started. After 72 hours of reaction, the reaction product was collected and analyzed. In FIG. 1, a represents the amounts of isoparaffins, and b represents the amounts of normal paraffins.

Subsequently, at the same hydrogen partial pressure, LHSV, and hydrogen/oil ratio, the reaction temperature was increased stepwise to 350° C., thereby increasing the normal paraffin conversion in the feedstock. After the reaction at each reaction temperature in each of the stages was conducted for 72 hours and the reaction was stabilized, each reaction product was collected and analyzed.

(Separation and Recovery of Lubricant Base Oil Fractions)

Based on the analysis results for the produced oils, each of the each of the produced oils s obtained at reaction temperatures at which the normal paraffin conversion as defined by the expression (A-I) above was 100%, was fractionated according to the following procedure, and the lubricant base oil fractions described below were collected.

Figure 2:
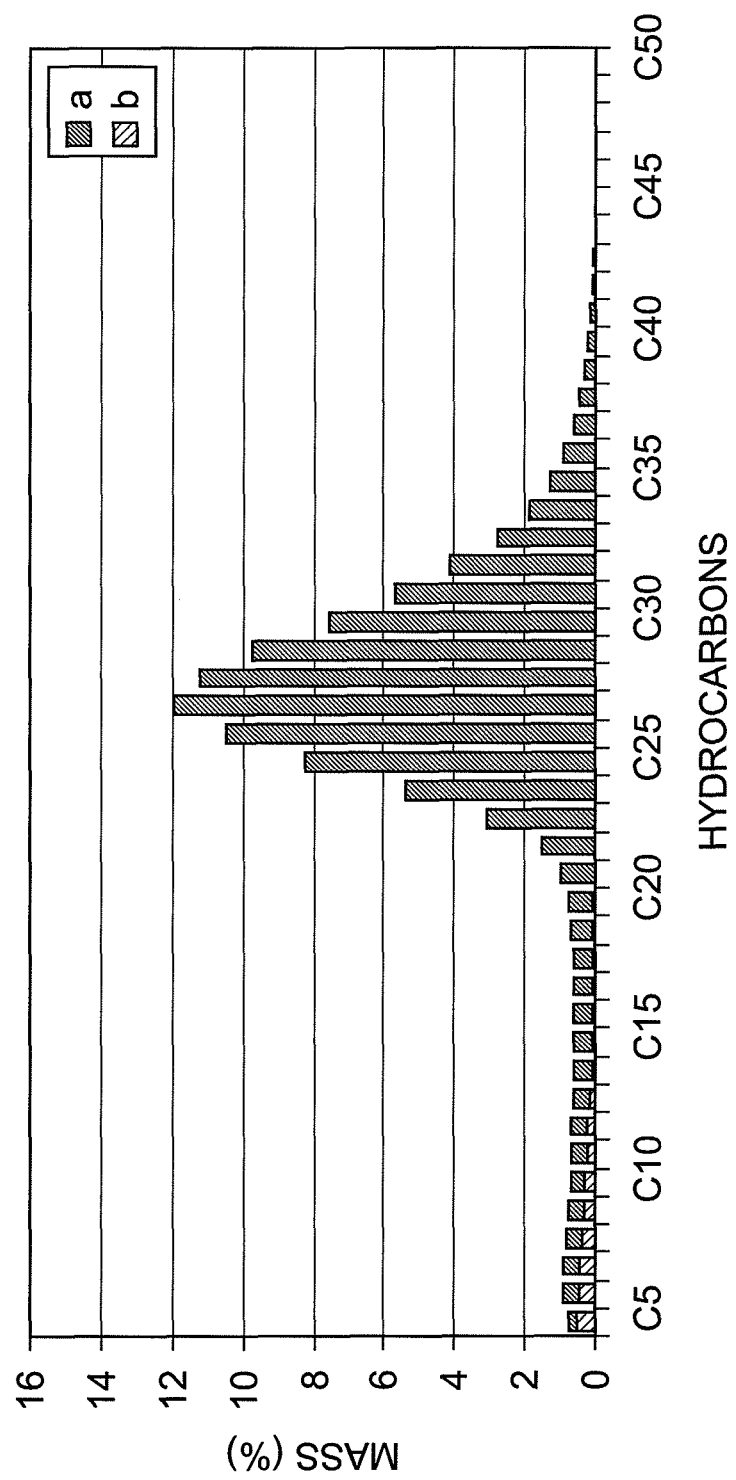
FIG. 2 is a graph showing the composition of the reaction products at a reaction temperature of 320° C. obtained from the dewaxing treatment by the hydroisomerization reaction in Example 1.

Each of the produced oils obtained at reaction temperatures at which the normal paraffin conversion was 100%, was first fractionated into naphtha, kerosene and gas oil fractions, and heavy fractions. The heavy fractions were further fractionated into a lubricant base oil fraction in the boiling point range of 330 to 410° C. and having a kinematic viscosity at 100° C. of 2.7±0.1 cSt (hereinafter referred to as the "lubricant base oil fraction 1", and into a lubricant base oil fraction in the boiling point range of 410 to 450° C. and having a kinematic viscosity at 100° C. of 4.0±0.1 cSt (hereinafter referred to as the "lubricant base oil fraction 2"). The lowest reaction temperature at which the lubricant base oil fraction 2 had a pour point of −22.5° C. or less and a viscosity index of 140 or more was defined as Tc (° C.). Tc in this Example was 320° C. Table 1 shows the yields of the lubricant base oil fractions 1 and 2 as well as the properties of the lubricant base oil fraction 2 obtained at a reaction temperature of 320° C., together with the production conditions and the crush strength of Hydroisomerization Catalyst A. Further, FIG. 2 shows the composition of the reaction products at a reaction temperature of 320° C. In FIG. 2, a represents the amounts of isoparaffins, b represents the amounts of normal paraffins.

TABLE 1

| | | | Test Conditions and Hydroisomerization Catalyst properties | | | | | | | Dewaxing test results | | | | |
|---|---|---|---|---|---|---|---|---|---|---|---|---|---|---|
| | | | Calcination Temp- erature before Ion Exchange (° C.) | | Calcination Temperature of extruded Product | | | Calcination Temperature after Metal impregnation (° C.) | crush strength of Catalyst Part- icles (N/mm) | | Lubricant Base Oil Fraction Yield at Reaction Temperature Tc | | Lubricant Base Oil Properties on Fraction 2 at Reaction Temperature Tc | |
| | Hydro- isomer- ization Catalyst | Zeolite | | Binder | First Stage (° C.) | Second Stage (° C.) | Active Metal | | | Tc (° C.) | Fraction 1 (%) | Fraction 2 (%) | Pour Point (° C.) | Viscosity Index |
| Ex. A-1 | A | ZSM-22 | — | Alumina | 400 | — | Platinum | 400 | 12.4 | 320 | 31 | 48 | −27.5 | 146 |
| Ex. A-2 | B | ZSM-22 | — | Alumina | 400 | 550 | Platinum | 400 | 13.0 | 320 | 31 | 47 | −25.0 | 144 |
| Ex. A-3 | C | ZSM-22 | — | Silica | 400 | 550 | Platinum | 400 | 9.0 | 340 | 28 | 45 | −25.0 | 143 |
| Ex. A-4 | D | ZSM-22 | — | Alumina | 440 | 550 | Platinum | 400 | 13.0 | 320 | 31 | 48 | −25.0 | 144 |
| Ex. A-5 | E | ZSM-23 | — | Alumina | 400 | 550 | Platinum | 400 | 13.0 | 330 | 27 | 40 | −22.5 | 146 |
| Ex. A-6 | F | ZSM-48 | — | Alumina | 400 | 550 | Platinum | 400 | 13.0 | 318 | 27 | 48 | −27.5 | 144 |
| Comp. Ex. A-1 | G | ZSM-22 | — | Alumina | 490 | — | Platinum | 400 | 13.0 | 318 | 27 | 38 | −25.0 | 143 |
| Comp. Ex. A-2 | H | ZSM-22 | 550 | Alumina | 400 | — | Platinum | 400 | 12.0 | 314 | 20 | 30 | −22.5 | 142 |
| Comp. Ex. A-3 | I | ZSM-22 | 550 | Alumina | 490 | — | Platinum | 400 | 13.0 | 312 | 18 | 26 | −25.0 | 145 |
| Comp. Ex. A-4 | J | ZSM-23 | — | Alumina | 490 | 550 | Platinum | 400 | 13.0 | 325 | 25 | 38 | −22.5 | 146 |
| Comp. Ex. A-5 | K | ZSM-48 | — | Alumina | 490 | 550 | Platinum | 400 | 13.0 | 316 | 25 | 40 | −22.5 | 144 |

Example A-2

Hydroisomerization Catalyst Preparation

An ion-exchanged NH$_4$-form ZSM-22 was obtained by the same procedure as in Example A-1, further the extrusion method was conducted using alumina as a binder by the same procedure as in Example A-1, thereby giving the same extruded product as in Example A-1.

The obtained extruded product was dried for 3 hours under an air stream in a drier at 120° C., and heated for 3 hours at 400° C. under an air stream, subsequently calcined by heating under an air stream for 3 hours at 550° C., thereby giving extruded and calcined support particles.

Platinum impregnation on the obtained extruded and calcined support particles, drying and calcination were carried out in the same procedure as in Example A-1, thereby giving Hydroisomerization Catalyst B. The crush strength of the catalyst particles obtained was 13.0 N/mm.

(Dewaxing and Separation and Recovery of Lubricant Base Oil Fractions)

Dewaxing and analysis for reaction products, separation and recovery of lubricant base oil were carried out in the same procedure as in Example A-1 except that Hydroisomerization Catalyst B was used in place of Hydroisomerization Catalyst A. As a result, Tc was 320° C. Table 1 shows the yields of the lubricant base oil fractions 1 and 2 obtained from reaction products at a reaction temperature of 320° C. and having the same classification as in Example A-1 as well as the properties of the lubricant base oil fraction 2, together with the production conditions and the crush strength of Hydroisomerization Catalyst B.

Example A-3

Hydroisomerization Catalyst Preparation

A extruded and calcined support particle was obtained by the same procedure as in Example A-2, except that the binder was changed from alumina to silica.

Platinum impregnation on the obtained support particles, drying and calcination were carried out in the same procedure as in Example A-1, thereby giving Hydroisomerization Catalyst C. The crush strength of the catalyst particles obtained was 9.0 N/mm.

(Dewaxing and Separation and Recovery of Lubricant Base Oil Fractions)

Dewaxing and analysis for reaction products, separation and recovery of lubricant base oil were carried out in the same procedure as in Example A-1, except that Hydroisomerization Catalyst C was used in place of Hydroisomerization Catalyst A. As a result, Tc was 340° C. Table 1 shows the yields of the lubricant base oil fractions 1 and 2 obtained from reaction products at a reaction temperature of 340° C. and having the same classification as in Example A-1 as well as the properties of the lubricant base oil fraction 2, together with the production conditions and the crush strength of Hydroisomerization Catalyst C.

Example A-4

Hydroisomerization Catalyst Preparation

A extruded product the same as Example A-1 containing alumina as a binder was obtained in the same procedure as in Example A-1. This extruded product was dried for 3 hours under an air stream in a drier at 120° C., and heated for 3 hours at 440° C. under an air stream, subsequently calcined by heating under an air stream for 3 hours at 550° C., thereby giving extruded and calcined support particles.

Platinum impregnation on the obtained extruded and calcined support particles, drying and calcination were carried out in the same procedure as in Example A-1, thereby giving Hydroisomerization Catalyst D. The crush strength of the catalyst particles obtained was 13.0 N/mm.

(Dewaxing and Separation and Recovery of Lubricant Base Oil Fractions)

Dewaxing and analysis for reaction products, separation and recovery of lubricant base oil were carried out in the same procedure as in Example A-1, except that Hydroisomerization Catalyst D was used in place of Hydroisomerization Catalyst A. As a result, Tc was 320° C. Table 1 shows the yields of the lubricant base oil fractions 1 and 2 obtained from reaction products at a reaction temperature of 320° C. and having the same classification as in Example A-1 as well as the properties of the lubricant base oil fraction 2, together with the production conditions and the crush strength of Hydroisomerization Catalyst D.

Example A-5

Hydroisomerization Catalyst Preparation

<Zeolite ZSM-23 Synthesis>

A ZSM-23 zeolite (hereinafter, sometimes referred to as the "ZSM-23") having a Si/Al ratio of 30 was prepared by hydrothermal synthesis according to the process described in EXAMPLE 2 of U.S. Pat. No. 4,490,342.

First, Diquat-7 (N,N,N,N',N',N'-hexamethyl-1,7-diaminoheptanedibromide), i.e., an organic template, was synthesized by partly modifying the process described in EXAMPLE A of the above-mentioned U.S. Pat. No. 4,490,342. Specifically, 50 g of 1,7-dibromoheptane and 100 ml of ethanol were mixed in a round bottom flask, 70 g of triethylamine (33 mass % ethanol solution) was added thereto with stirring, and the mixture was heated under reflux overnight. The reaction product was cooled to −21° C., and crystals were recovered by filtration. The crystals were washed with diethylether cooled to −21° C., and dried at room temperature, thereby giving intended Diquat-7 (a dibromide salt).

Using the Diquat-7 obtained above, the ZSM-23 was synthesized according to the following procedure.

First, the following two types of solutions were prepared. Solution E: A solution prepared by diluting 15 g of colloidal silica (Ludox HS-40 by Grace Davison) with 31.6 ml of ion-exchange water. Solution F: A solution prepared by thoroughly mixing 48.3 ml of ion-exchange water, 0.327 g of sodium aluminate, 1.22 g of sodium hydroxide, 0.9 g of sulfuric acid, and 2.74 g of the Diquat-7 salt.

Next, Solution F was introduced into Solution E with stirring. The resulting gel was transferred into a 120 ml internal volume stainless steel autoclave reactor, and the reaction was allowed to proceed while rotating the autoclave reactor itself at a rotational speed of about 60 rpm for 72 hours in an oven at 160° C. After the completion of the reaction, the reactor was cooled, the produced solids were recovered by filtration, the solids were washed with ion-exchange water, and dried overnight in a drier at 60° C., thereby giving an organic template-containing ZSM-23 having a Si/Al ratio of 30.

<Ion exchanged ZSM-23 Preparation>

The same procedure as the ion exchange of ZSM-22 in Example A-1 was performed, except that the organic template-containing ZSM-23 obtained above was used instead of the organic template-containing ZSM-22, thereby giving ion-exchanged $NH_4$-form ZSM-23.

<Mixing of a Binder, Extrusion, and Calcination>

Using the ion-exchanged ZSM-23 obtained above and alumina, i.e., a binder, the same procedure as in Example A-2 was performed to give a extruded product, which was then further calcined at 400° C. and 550° C. by the same procedure as in Example A-2, thereby giving extruded and calcined support particles.

<Platinum impregnation, and Calcination>

Platinum impregnation, drying and calcination were carried out in the same procedure as in Example A-2, except that the extruded and calcined support particles containing ZSM-23 obtained above was used in place of the extruded and calcined support particles containing ZSM-22, thereby giving Hydroisomerization Catalyst E. The crush strength of the catalyst particles obtained was 13.0 N/mm.

(Dewaxing and Separation and Recovery of Lubricant Base Oil Fractions)

Dewaxing and analysis for reaction products, separation and recovery of lubricant base oil were carried out in the same procedure as in Example A-1, except that Hydroisomerization Catalyst E was used in place of Hydroisomerization Catalyst A. As a result, Tc was 330° C. Table 1 shows the yields of the lubricant base oil fractions 1 and 2 obtained from reaction products at a reaction temperature of 330° C. and having the same classification as in Example A-1 as well as the properties of the lubricant base oil fraction 2, together with the production conditions and the crush strength of Hydroisomerization Catalyst E.

Example A-6

Hydroisomerization Catalyst Preparation

<Zeolite ZSM-48 Synthesis>

An organic template-containing zeolite ZSM-48 (hereinafter sometimes referred to as the "ZSM-48") having a Si/Al ratio of 30 was synthesized based on Applied Catalysis A: General vol. 299 (2006) 167-174.

<Ion exchanged ZSM-48 Preparation>

The same procedure as the ion exchange of ZSM-22 in Example A-1 was performed, except that the organic template-containing ZSM-48 obtained above was used instead of the organic template-containing ZSM-22, thereby giving ion-exchanged $NH_4$-form ZSM-48.

<Mixing of a Binder, Extrusion, and Calcination>

Using the ion-exchanged ZSM-48 obtained above and alumina, i.e., a binder, the same procedure as in Example A-2 was performed to give a extruded product, which was then further calcined at 400° C. and 550° C. by the same procedure as in Example A-2, thereby giving extruded and calcined support particles.

<Platinum Impregnation, and Calcination>

Platinum impregnation, drying and calcination were carried out in the same procedure as in Example A-2, except that the extruded and calcined support particles containing ZSM-48 obtained above was used in place of the extruded and calcined support particles containing ZSM-22, thereby giving Hydroisomerization Catalyst F. The crush strength of the catalyst particles obtained was 13.0 N/mm.

(Dewaxing of a Wax and Separation and Recovery of Lubricant Base Oil Fractions)

Dewaxing of a wax and analysis for reaction products, separation and recovery of lubricant base oil were carried out in the same procedure as in Example A-1, except that Hydroisomerization Catalyst F was used in place of Hydroisomerization Catalyst A. As a result, Tc was 318° C. Table 1 shows the yields of the lubricant base oil fractions 1 and 2 obtained from reaction products at a reaction temperature of 318° C. and having the same classification as in Example A-1 as well as the properties of the lubricant base oil fraction 2, together with the production conditions and the crush strength of Hydroisomerization Catalyst F.

Comparative Example A-1

Hydroisomerization Catalyst Preparation

A extruded and calcined support particle was obtained by the same procedure as in Example A-1, except that the calcination temperature of the extruded product was changed from 400° C. to 470° C.

Platinum impregnation on the obtained support particles, drying and calcination were carried out in the same procedure as in Example A-1, thereby giving Hydroisomerization Catalyst G The crush strength of the catalyst particles obtained was 13.0 N/mm.

(Dewaxing of a Wax and Separation and Recovery of Lubricant Base Oil Fractions)

Dewaxing of a wax and analysis for reaction products, separation and recovery of lubricant base oil were carried out in the same procedure as in Example A-1, except that Hydroisomerization Catalyst G was used in place of Hydroisomerization Catalyst A. As a result, Tc was 316° C. Table 1 shows the yields of the lubricant base oil fractions 1 and 2 obtained from reaction products at a reaction temperature of 316° C. and having the same classification as in Example A-1 as well as the properties of the lubricant base oil fraction 2, together with the production conditions and the crush strength of Hydroisomerization Catalyst G Comparative Example A-2

Hydroisomerization Catalyst Preparation

The organic template-containing ZSM-22 in the powder form obtained by being synthesized in the same manner as in Example A-1 was calcined, under an air stream, at 550° C. for 6 hours.

The calcined ZSM-22 obtained above was taken in a flask, and ion exchange and drying in an ammonium chloride aqueous solution were carried out in the same procedure as in Example A-1, thereby giving an $NH_4$-form ZSM-22.

A extruded product was obtained in the same procedure as in Example A-1 from the $NH_4$-form ZSM-22 obtained above and alumina, i.e., a binder. Thereafter, calcination, platinum impregnation, drying and calcination were carried out in the same manner as in Example A-1, thereby giving Hydroisomerization Catalyst H. The crush strength of the catalyst particles obtained was 12.0 N/mm.

(Dewaxing of a Wax and Separation and Recovery of Lubricant Base Oil Fractions)

Dewaxing of a wax and analysis for reaction products, separation and recovery of lubricant base oil were carried out in the same procedure as in Example A-1, except that Hydroisomerization Catalyst H was used in place of Hydroisomerization Catalyst A. As a result, Tc was 314° C. Table 1 shows the yields of the lubricant base oil fractions 1 and 2 obtained from reaction products at a reaction temperature of 314° C. and having the same classification as in Example A-1 as well as the properties of the lubricant base oil fraction 2, together with the production conditions and the crush strength of Hydroisomerization Catalyst H.

Comparative Example A-3

Hydroisomerization Catalyst Preparation

The organic template-containing ZSM-22 in powder form obtained by being synthesized in the same manner as in Example A-1 was calcined in the same procedure as in Comparative Example A-2, and ion-exchanged.

A extruded product was obtained in the same procedure as in Example A-1 from the $Na_4$-form ZSM-22 obtained above and alumina, i.e., a binder. Then, the obtained extruded product was calcined, under an air stream, at 470° C. for 3, and subsequently platinum impregnation and calcination were carried out in the same procedure as in Example A-1, thereby giving Hydroisomerization Catalyst I. The crush strength of the catalyst particles obtained was 13.0 N/mm.

(Dewaxing and Separation and Recovery of Lubricant Base Oil Fractions)

Dewaxing and analysis for reaction products, separation and recovery of lubricant base oil were carried out in the same procedure as in Example A-1, except that Hydroisomerization Catalyst I was used in place of Hydroisomerization Catalyst A. As a result, Tc was 312° C. Table 1 shows the yields of the lubricant base oil fractions 1 and 2 obtained from reaction products at a reaction temperature of 312° C. and having the same classification as in Example A-1 as well as the properties of the lubricant base oil fraction 2, together with the production conditions and the crush strength of Hydroisomerization Catalyst I.

Comparative Example A-4

Hydroisomerization Catalyst Preparation

The same procedure as in Example A-5 was carried out, except the first stage calcination temperature of the extruded product obtained from the ion-exchanged ZSM-23 and alumina was changed from 400° C. to 470° C., thereby giving Hydroisomerization Catalyst J. The crush strength of the catalyst particles obtained was 13.0 N/mm.

(Dewaxing and Separation and Recovery of Lubricant Base Oil Fractions)

Dewaxing and analysis for reaction products, separation and recovery of lubricant base oil were carried out in the same procedure as in Example A-1, except that Hydroisomerization Catalyst J was used in place of Hydroisomerization Catalyst A. As a result, Tc was 325° C. Table 1 shows the yields of the lubricant base oil fractions 1 and 2 obtained from reaction products at a reaction temperature of 325° C. and having the same classification as in Example A-1 as well as the properties of the lubricant base oil fraction 2, together with the production conditions and the crush strength of Hydroisomerization Catalyst J.

Comparative Example A-5

Hydroisomerization Catalyst Preparation

The same procedure as in Example A-6 was carried out, except the first stage calcination temperature of the extruded product obtained from the ion-exchanged ZSM-48 and alumina was changed from 400° C. to 470° C., thereby giving Hydroisomerization Catalyst K. The crush strength of the catalyst particles obtained was 13.0 N/mm.

(Dewaxing and Separation and Recovery of Lubricant Base Oil Fractions)

Dewaxing and analysis for reaction products, separation and recovery of lubricant base oil were carried out in the same procedure as in Example A-1, except that Hydroisomerization Catalyst K was used in place of Hydroisomerization Catalyst A. As a result, Tc was 316° C. Table 1 shows the yields of the lubricant base oil fractions 1 and 2 obtained from reaction products at a reaction temperature of 316° C. and having the same classification as in Example A-1 as well as the properties of the lubricant base oil fraction 2, together with the production conditions and the crush strength of Hydroisomerization Catalyst K.

Example B-1

Hydroisomerization Catalyst Preparation

<Zeolite ZSM-22 Synthesis>

A zeolite ZSM-22 (hereinafter sometimes referred to as the "ZSM-22B") composed of crystalline aluminosilicate having a Si/Al ratio of 45 was prepared by hydrothermal synthesis in the following procedure according to the process as described in "Experimental Section" of the above-mentioned Non-Patent Document 2, page 1007.

First, the following four types of aqueous solutions were prepared.

Solution A: A solution prepared by dissolving 3.88 g of potassium hydroxide in 13.5 ml of ion-exchange water.

Solution B: A solution prepared by dissolving 1.78 g of aluminum sulfate 18-hydrate in 10 ml of ion-exchange water.

Solution C: A solution prepared by diluting 8.36 g of 1,6-hexanediamine (an organic template) with 65 mL of ion-exchange water.

Solution D: A solution prepared by diluting 36 g of colloidal silica (Ludox AS-40 manufactured by Grace Davison) with 61 ml of ion-exchange water.

Next, Solution A was added to Solution B, and the mixture was stirred until the aluminum component completely dissolved. After Solution C was added to this mixed solution, the mixture of Solutions A, B, and C was introduced into Solution D with vigorous stirring at room temperature. To the resulting mixture was further added, as a "seed crystal" that promotes crystallization, 0.5 g of a powder of ZSM-22B that had been separately synthesized, and had not been subjected to any special treatment after the synthesis, thereby giving a gel.

The gel obtained by the above procedure was transferred into a 120 ml internal volume stainless steel autoclave reactor, and the autoclave reactor was rotated at a rotational speed of about 60 rpm on a tumbling apparatus for 60 hours in an oven at 150° C., causing a hydrothermal synthesis reaction to take place. After the completion of the hydrothermal synthesis reaction, the reactor was opened after cooling, and the produced solid was collected by filtration. The resulting product was washed with ion-exchanged water, dried overnight in a drier at 60° C., thereby giving a zeolite ZSM-22 having a Si/Al ratio of 45 (referred to as "ZSM-22-1")

Figure 3:
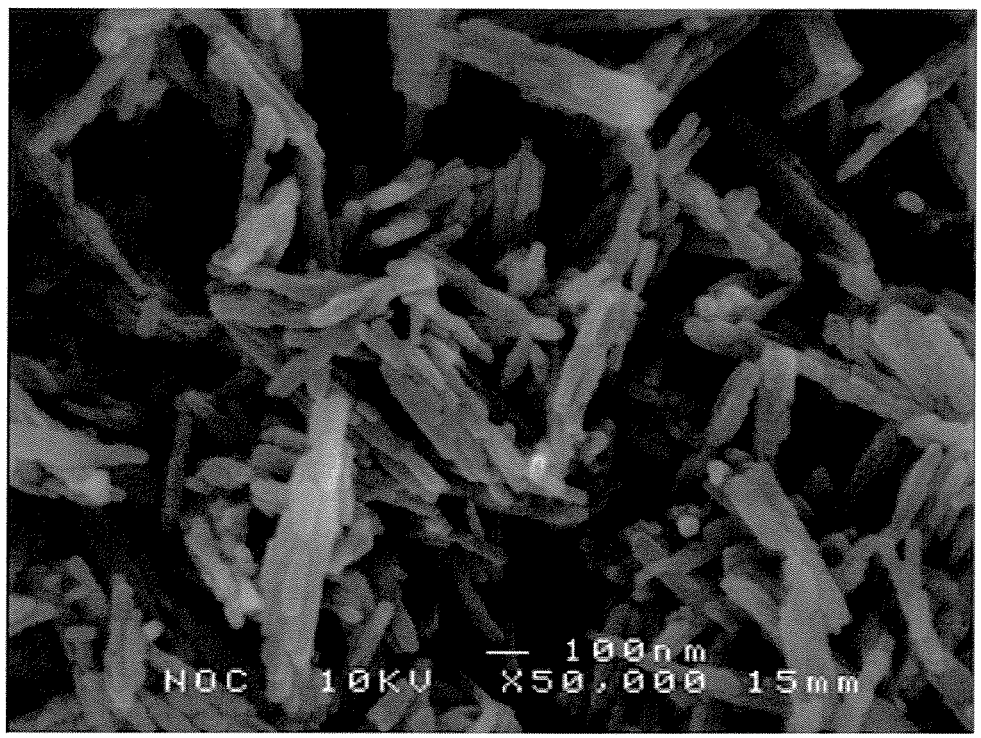
FIG. 3 is an SEM image of ZSM-22-1.

The obtained ZSM-22-1 was measured for the number average length of the longitudinal direction of the crystal aggregate and quantitated for the Si/Al ratio by XPS and XRF by the following method respectively. Table 2 shows the results. Moreover, FIG. 3 shows an image of ZSM-22-1 taken using a scanning electron microscope.

(The Number Average Length of the Longitudinal Direction of the Crystal Aggregate)

The length of the long axis of randomly selected 100 crystal aggregates was individually measured based on an image taken at a magnification of 50000 times of a spontaneous scope observed using a scanning electron microscope, whereby the arithmetic mean value thereof was determined as the number average length of the longitudinal direction of the crystal aggregate.

(Quantitation of Si/Al Ratio by XPS and XRF)

According to a standard method, the Si/Al ratio quantitations by XPS and XRF were carried out respectively, and the ratios thereof were further determined.

TABLE 2

| Synthesis Conditions and Analysis Target | ZSM-22-1 | ZSM-22-C1 |
|---|---|---|
| Hydrothermal Synthesis Time (h) | 60 | 60 |
| Number of Reactor Rotation (rpm) | 60 | 30 |
| Si/Al Ratio (XRF) | 31 | 33 |
| Si/Al Ratio (XPS) | 28 | 17 |
| [Si/Al ratio]$_{XPS}$/[Si/Al ratio]$_{XRF}$ | 0.90 | 0.52 |

<Ion Exchanged ZSM-22-1 Preparation>

The ZSM-22 obtained above was subjected to ion-exchange treatment in an aqueous solution containing ammonium ions, according to the following procedure.

Each of the ZSM-22-1 obtained above was taken in a flask, and 100 ml of 0.5 N-ammonium chloride aqueous solution per gram of each of the zeolite ZSM-22-1 was added thereto, and the mixture was heated under reflux for 6 hours. After cooling the heated mixture to room temperature, the supernatant was removed, and the solid was washed with ion-exchange water. To the resulting product, the same amount of 0.5 N-ammonium chloride aqueous solution as above was added again, and the mixture was heated under reflux for 12 hours.

Then, the solid was recovered by filtration, washed with ion-exchanged water, and dried overnight in a drier at 60° C., thereby giving ion-exchanged NH$_4$-form ZSM-22-1. The ZSM-22-1 is an ion-exchanged zeolite containing an organic template.

<Mixing of a Binder, Extrusion, and Calcination>

The NH$_4$-form ZSM-22-1 obtained above was mixed with alumina, i.e., a binder, in a mass ratio of 7:3, a small amount of ion-exchange water was added thereto, and the mixture was kneaded. The resulting viscous fluid was loaded in an extruder and extruded into a cylindrical shape product having a diameter of about 1.6 mm and a length of about 10 mm. This extruded product was calcined under an air stream for 3 hours at 400° C., thereby giving extruded and calcined support particles.

<Platinum impregnation, and Calcination>

Tetraamminedichloroplatinum (II) (Pt(NH$_3$)$_4$Cl$_2$) was dissolved in an amount of ion-exchange water equivalent to the previously measured amount of water absorption of the support particles, thus giving an impregnation solution. This solution was impregnated in the above-described support particles by incipient wetting, and supported on the support particles such that the amount of platinum was 0.3 mass % based on the mass of the zeolite ZSM-22. Next, the resulting impregnation product was dried overnight in a drier at 60° C., and then calcined under an air stream for 3 hours at 400° C., thereby giving Hydroisomerization Catalyst 1B.

(Dewaxing of a Wax)

A stainless-steel reaction tube having an inner diameter of 15 mm and a length of 380 mm was loaded with 100 ml of Hydroisomerization Catalyst 1B obtained above, and reduction treatment was performed for 12 hours under a hydrogen stream (the hydrogen partial pressure: 3 MPa) at a catalyst layer average temperature of 350° C. Subsequently, a petroleum-based wax as a feedstock (the distribution of the numbers of carbon atoms: C21 to C38; the composition is shown in FIG. 1) was passed at a reaction temperature of 300° C., a hydrogen partial pressure of 3 MPa, an LHSV of 4.0 h$^{-1}$, and a hydrogen/oil ratio of 592 NL/L, and the isomerization reaction was initiated in the presence of hydrogen. After 72 hours of the reaction, the reaction product was collected and analyzed. In FIG. 1, a represents the amounts of isoparaffins, and b represents the amounts of normal paraffins.

Subsequently, at the same hydrogen partial pressure, hydrogen/oil ratio and the reaction temperature, LHSV was changed stepwise to 0.3, thereby changing the feedstock conversion. The reaction was conducted for 72 hours at the LHSV in each step and stabilized, and each reaction product was collected and analyzed. Further, as the activity criteria of the hydroisomerization catalysts, Table 3 shows the normal paraffins conversions as defined by the above expression (B-II) at contact times (1/LHSV) of 0.30 h and 2.30 h.

Furthermore, as the isomerization selectivity criteria of the hydroisomerization catalysts, Table 3 shows the yields of isoparaffins having C21 or more in the shortest contact time (2.8 h in this Example) at which the normal paraffin conversion reached 100% and the contact time thereat.

(Separation and Recovery of Lubricant Base Oil Fractions)

Based on the analysis results for reaction products obtained at each step in the above dewaxing of the wax, the reaction products obtained at each step wherein a contact time is greater than the contact time at which the normal paraffin conversion in feedstock (conversion as defined by the formula (B-II)) reaches 100% (1/LHSV=2.8 h) were fractionated according to the following procedure, and the lubricant base oil fractions described below were collected.

The reaction products obtained at each step in which the above-described contact time was greater than 2.8 h were first fractionated into naphtha, kerosene and gas oil fractions, and heavy fractions. The heavy fractions were further fractionated into a lubricant base oil fraction in the boiling point range of 330 to 410° C. and having a kinematic viscosity at 100° C. of 2.7±0.1 cSt (hereinafter referred to as the "lubricant base oil fraction 1B", and into a lubricant base oil fraction in the boiling point range of 410 to 450° C. and having a kinematic viscosity at 100° C. in the range of 4.0±0.1 cSt (hereinafter referred to as the "lubricant base oil fraction 2B"). The lowest contact time at which the above lubricant base oil fraction 2 had a pour point of −22.5° C. or less and a viscosity index of 140 or more was defined as tc. The tc in this Example was 3.7 h. The yield of the above lubricant base oil fraction 1B obtained at a contact time of 3.7 h was 30% in relation to the feedstock, and the yield of the above lubricant base oil fraction 2B was 46%. Further, the above lubricant base oil fraction 2B had a pour point of −25.0° C. and a viscosity index of 144.

TABLE 3

| | Hydroisomerization Catalyst | Normal Paraffin Conversion at 1/LHSV = 0.30 h (%) | Normal Paraffin Conversion at 1/LHSV = 2.30 h (%) | At Time Normal Paraffin Conversion reached 100% | |
|---|---|---|---|---|---|
| | | | | Yield of C21+ Isoparaffin Isomer (%) | 1/LHSV (h) |
| Ex. B-1 | Hydroisomerization Catalyst 1B | 18.0 | 91.0 | 85.3 | 2.8 |

TABLE 3-continued

| | Hydroisomerization Catalyst | Normal Paraffin Conversion at 1/LHSV = 0.30 h (%) | Normal Paraffin Conversion at 1/LHSV = 2.30 h (%) | At Time Normal Paraffin Conversion reached 100% | |
|---|---|---|---|---|---|
| | | | | Yield of C21+ Isoparaffin Isomer (%) | 1/LHSV (h) |
| Ex. B-2 | Hydroisomerization Catalyst 2B | 20.0 | 97.0 | 79.0 | 2.4 |
| Comp. Ex. B-1 | Hydroisomerization Catalyst C-1 | 13.5 | 83.0 | 85.2 | 3.6 |
| Comp. Ex. B-2 | Hydroisomerization Catalyst C-2 | 19.5 | 95.0 | 78.5 | 2.5 |
| Comp. Ex. B-3 | Hydroisomerization Catalyst C-3 | 22.6 | 100.0 | 69.8 | 2.0 |
| Comp. Ex. B-4 | Hydroisomerization Catalyst C-4 | 21.0 | 98.5 | 70.0 | 2.3 |

Example B-2

The same procedure as in Example B-1 was carried out, except the extruded product composed of the ion-exchanged ZSM-22-1 and alumina was calcined at 550° C. instead of 400° C., thereby giving Hydroisomerization Catalyst 2B.

Dewaxing of a wax was carried out in the same procedure as in Example B-1, except that Hydroisomerization Catalyst 2B was used in place of Hydroisomerization Catalyst 1B. Table 3 shows the results.

Comparative Example B-1

Figure 4:
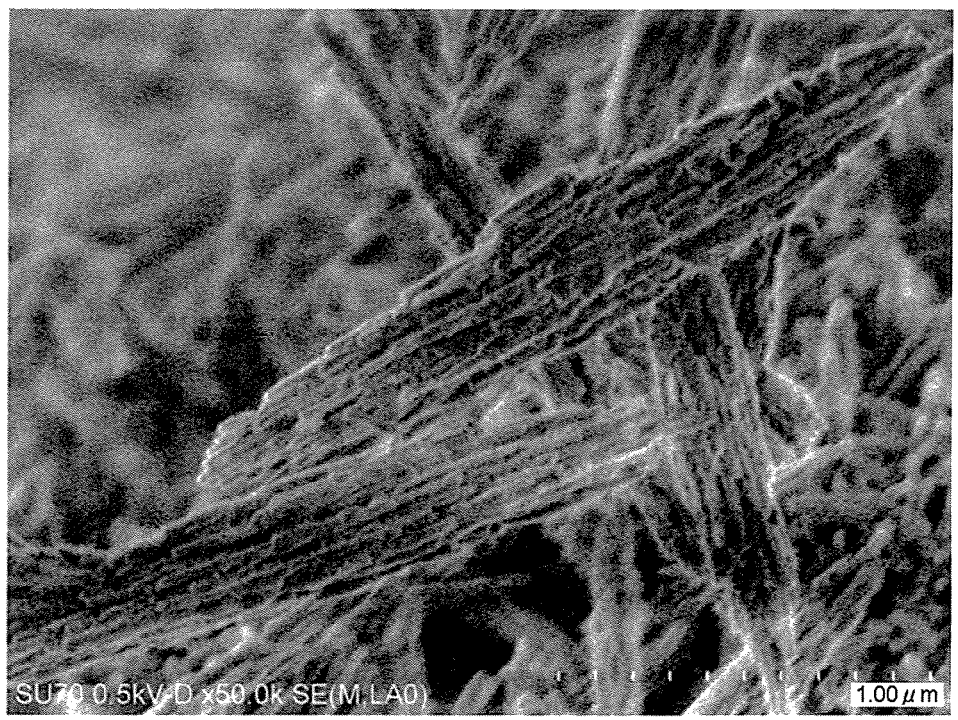
FIG. 4 is an SEM image of ZSM-22-C1.

The zeolite ZSM-22 was synthesized in the same procedure as in Example B-1, except that the number of tumbling rotation of an autoclave reactor was 30 rpm instead of 60 rpm. The properties of the obtained zeolite ZSM-22 (referred to as "ZSM-22-C1") were analyzed in the same manner as in Example B-1. Table 2 shows the results. Moreover, FIG. 4 shows an image of ZSM-22-C1 taken using a scanning electron microscope.

Using the ZSM-22-C1 obtained above, a hydroisomerization catalyst was prepared in the same operation and procedure as in Example B-1, thereby giving Hydroisomerization Catalyst C-1.

Dewaxing of a wax was carried out in the same procedure as in Example B-1, except that Hydroisomerization Catalyst C-1 was used in place of Hydroisomerization Catalyst 1B. Table 3 shows the results.

Based on the analysis results for reaction products obtained at each step in the above dewaxing of the wax, the reaction products obtained at each step wherein a contact time is greater than the contact time at which the normal paraffin conversion in feedstock (conversion as defined by the formula (B-II)) reaches 100% (1/LHSV=3.6 h) were fractionated according to the following procedure, and the lubricant base oil fractions described below were collected.

By fractionating the reaction products at each stage in which the normal paraffin conversion was 100% in the same manner as in Example B-1, the lubricant base oil fractions 1B and 2B having the same classification as in Example B-1 were separated and collected. The tc in this Comparative Example was 4.5 h. The yield of the above lubricant base oil fraction 1B obtained at a contact time of 4.5 h was 29% in relation to the feedstock, and the yield of the above lubricant base oil fraction 2B was 45%. Further, the above lubricant base oil fraction 2B had a pour point of −27.5° C. and a viscosity index of 142.

Comparative Example B-2

A hydroisomerization catalyst was prepared in the same procedure as in Comparative Example B-1, except that the extruded product composed of the ion-exchanged ZSM-22-C1 and alumina was calcined at 550° C. instead of 400° C., thereby giving Hydroisomerization Catalyst C-2.

Dewaxing was carried out in the same procedure as in Example B-1, except that Hydroisomerization Catalyst C-2 was used in place of Hydroisomerization Catalyst 1B. Table 3 shows the results.

Comparative Example B-3

The ZSM-22-1 obtained in Example B-1 was calcined, under an air stream, at 550° C. for 3 hours, thereby giving the calcined ZSM-22-1. On the other hand, the ion exchange was carried out using ammonium ion in the same manner as in Example B-1, thereby giving a calcined and ion-exchanged $NH_4$-form ZSM-22-1. The resulting product was mixed with alumina, i.e., a binder, extruded, calcined, caused to support platinum and calcined in the same manner as in Example B-2, thereby giving Hydroisomerization Catalyst C-3.

Dewaxing was carried out in the same procedure as in Example B-1, except that Hydroisomerization Catalyst C-3 was used in place of Hydroisomerization Catalyst 1B. Table 3 shows the results.

Comparative Example B-4

The ZSM-22-C1 obtained in Example B-2 was calcined, under an air stream, at 550° C. for 3 hours, thereby giving the calcined ZSM-22-C1. On the other hand, the ion exchange was carried out using ammonium ion in the same manner as in Example B-1, thereby giving a calcined and ion-exchanged $NH_4$-form ZSM-22-C1. The resulting product was mixed with alumina, i.e., a binder, extruded, calcined, caused to support platinum and calcined in the same manner as in Example B-2, thereby giving Hydroisomerization Catalyst C-4.

Dewaxing was carried out in the same procedure as in Example B-1, except that Hydroisomerization Catalyst C-4 was used in place of Hydroisomerization Catalyst 1B. Table 3 shows the results.

Based on the results of the above Examples and Comparative Examples, it is assured that, by using the hydroisomerization catalysts of the present invention, dewaxing can be carried out at a higher isomerization selectivity, compared with the catalysts of Comparative Examples. Further, the hydroisomerization catalysts of Examples make it possible to obtain an equivalent isomer yield in a lower contact time compared with Comparative Examples, due to the high hydroisomerization activity, in the case where the isomerization selectivity is equivalent to that of Comparative Examples. Consequently, according to the second hydroisomerization catalyst of the present invention, dewaxing can be carried with high productivity without using a larger reactor.

It is also assured that the hydroisomerization catalysts of Examples, in the separation and collection of lubricant base oils, can obtain such a base oil with equivalent performance and yield in a shorter contact time compared with Comparative Examples.

The invention claimed is:

1. A method for producing a hydroisomerization catalyst, comprising:
    performing an ion-exchange treatment in a solution comprising ammonium ions and/or protons and at least 50 vol % water to obtain an ion-exchanged zeolite from an organic template-containing zeolite, which comprises a 10-membered ring one-dimensional porous structure;
    obtaining an extruded product by extruding a composition comprising the ion-exchanged zeolite and at least one inorganic oxide selected from the group consisting of alumina, silica, titania, boria, zirconia, magnesia, ceria, zinc oxide, phosphorus oxide, and a composite oxide comprising a combination of two or more of these oxides;
    obtaining a support by calcining the extruded product by thermally treating within a range of 350° C. to 450° C.; and
    supporting on the support at least one metal selected from the group consisting of metals belonging to Groups 8 to 10 of the periodic table, molybdenum and tungsten.

2. The method for producing the hydroisomerization catalyst according to claim 1, wherein the organic template-containing zeolite is at least one selected from the group consisting of a zeolite ZSM-22, ZSM-23, and ZSM-48.

3. The method for producing the hydroisomerization catalyst according to claim 1, wherein the inorganic oxide is alumina.

4. The method for producing the hydroisomerization catalyst according to claim 1, wherein the metal supported on the support is platinum and/or palladium.

5. The method for producing the hydroisomerization catalyst according to claim 1, wherein a molar ratio of silicon atoms to aluminum atoms ([Si]/[Al]) in the organic template-containing zeolite is 10 to 400.

6. The method for producing the hydroisomerization catalyst according to claim 1, wherein the organic template-containing zeolite is a crystal aggregate having a number average length of the longitudinal direction of 0.01 to 1 µm.

7. The method for producing the hydroisomerization catalyst according to claim 6, wherein the organic template-containing zeolite satisfies the following formula (B-I)

$$0.8 \leq [Si/Al]_{XPS}/[Si/Al]_{XRF} \leq 1.0 \quad (B\text{-}I)$$

wherein $[Si/Al]_{XPS}$ represents a molar ratio of silicon atoms to aluminum atoms in the organic template-containing zeolite measured using an X-ray photoelectron spectroscopy analysis, and $[Si/Al]_{XRF}$ represents a molar ratio of silicon atoms to aluminum atoms in the organic template-containing zeolite measured using an X-ray fluorescence analysis.

8. The method for producing a hydroisomerization catalyst according to claim 1, wherein the obtained support is thermally treated at a temperature that is greater than 450° C. and less than or equal to 650° C.

9. A hydroisomerization catalyst obtained by the method according to claim 1.

10. A method for dewaxing a hydrocarbon oil, comprising contacting, in the presence of hydrogen, a hydrocarbon oil comprising normal paraffins having 10 or more carbon atoms, with the hydroisomerization catalyst according to claim 9, thereby converting a portion or all of the normal paraffins to isoparaffins.

11. The method for dewaxing a hydrocarbon oil according to claim 10, wherein the hydrocarbon oil is at least one selected from the group consisting of vacuum gas oils, hydrocracked vacuum residual oils, slack waxes, deoiled waxes, paraffinic waxes, microcrystalline waxes, petrolatum, and Fischer-Tropsch synthesis waxes.

12. A method for producing a lubricant base oil, comprising contacting, in the presence of hydrogen, a hydrocarbon oil containing normal paraffins having 10 or more carbon atoms, with the hydroisomerization catalyst according to claim 9 under conditions that give substantially 100 mass % conversion of the normal paraffins, as defined by the following expression (A-I):

[Expression 1]

$$\text{Normal paraffin conversion (\%)} = \left[1 - \frac{\left(\begin{array}{c}\text{Total mass of the}\\ \text{normal paraffins having}\\ Cn \text{ or more}\\ \text{contained in the}\\ \text{hydrocarbon oil}\\ \text{after contacting}\end{array}\right)}{\left(\begin{array}{c}\text{Total mass of the}\\ \text{normal paraffins having}\\ Cn \text{ or more}\\ \text{contained in the}\\ \text{hydrocarbon oil}\\ \text{before contacting}\end{array}\right)}\right] \times 100 \quad (A\text{-}I)$$

wherein Cn represents a minimum number of carbon atoms of the normal paraffins having 10 or more carbon atoms contained in the hydrocarbon oil before contacting.

13. A method for producing a hydroisomerization catalyst, comprising:
    performing an ion-exchange treatment in a solution comprising ammonium ions and/or protons and at least 50 vol % water to obtain an ion-exchanged zeolite from an organic template-containing zeolite, which is a crystal aggregate having a number average length of the longitudinal direction of 0.01 to 1 µm and comprises a 10-membered ring one-dimensional porous structure;
    obtaining an extruded product by extruding a composition comprising the ion-exchanged zeolite and an inorganic porous oxide;
    obtaining a support by calcining the extruded product by thermally treating; and
    supporting on the support at least one metal selected from the group consisting of metals belonging to Groups 8 to 10 of the periodic table, molybdenum and tungsten.

14. The method for producing the hydroisomerization catalyst according to claim 13, wherein the organic template-containing zeolite is at least one selected from the group consisting of a zeolite ZSM-22, a zeolite ZSM-23, and a zeolite ZSM-48.

15. The method for producing the hydroisomerization catalyst according to claim 13, wherein the organic template-containing zeolite satisfies the following formula (B-I)

$$0.8 \leq [Si/Al]_{XPS}/[Si/Al]_{XRF} \leq 1.0 \quad \text{(B-I)}$$

wherein $[Si/Al]_{XPS}$ represents a molar ratio of silicon atoms to aluminum atoms in the organic template-containing zeolite measured using an X-ray photoelectron spectroscopy analysis, and $[Si/Al]_{XRF}$ represents a molar ratio of silicon atoms to aluminum atoms in the organic template-containing zeolite measured using an X-ray fluorescence analysis.

16. The method for producing the hydroisomerization catalyst according to claim 13, wherein the metal (c) is platinum and/or palladium.

17. The method for producing the hydroisomerization catalyst according to claim 13, wherein the inorganic porous oxide is alumina.

18. The method for producing a hydroisomerization catalyst according to claim 13, wherein obtaining a support by calcining the extruded product by thermally treating includes thermally treating the extruded product at a temperature within a range of 350° C. to 450° C.

19. A hydroisomerization catalyst obtained by the method according to claim 13.

20. A method for dewaxing a hydrocarbon oil, comprising contacting, in the presence of hydrogen, a hydrocarbon oil comprising normal paraffins having 10 or more carbons, with the hydroisomerization catalyst according to claim 19, thereby converting a portion or all of the normal paraffins to isoparaffins.

21. The method for dewaxing a hydrocarbon oil according to claim 20, wherein the hydrocarbon oil is at least one selected from the group consisting of vacuum gas oils, hydrocracked residual oils of vacuum gas oils, slack waxes, dewaxed oils, paraffinic waxes, microcrystalline waxes, petrolatum, and Fischer-Tropsch synthesis waxes.

22. A method for producing a lubricant base oil comprising contacting, in the presence of hydrogen, a hydrocarbon oil comprising normal paraffins having 10 or more carbon atoms, with the hydroisomerization catalyst of claim 19, under conditions that give substantially 100 mass % conversion of the normal paraffins, as defined by the following expression (B-II):

[Expression 2]

$$\text{Normal paraffin conversion}(\%) = \left[1 - \frac{\left(\begin{array}{c}\text{Total mass of the}\\\text{normal paraffins having}\\ Cn \text{ or more}\\\text{contained in the}\\\text{hydrocarbon oil}\\\text{after contacting}\end{array}\right)}{\left(\begin{array}{c}\text{Total mass of the}\\\text{normal paraffins having}\\ Cn \text{ or more}\\\text{contained in the}\\\text{hydrocarbon oil}\\\text{before contacting}\end{array}\right)}\right] \times 100 \quad \text{(B-II)}$$

wherein Cn represents a minimum number of carbon atoms of the normal paraffins having 10 or more carbon atoms contained in the hydrocarbon oil before contacting.

* * * * *